US012627054B2

(12) United States Patent
Jhang et al.

(10) Patent No.: US 12,627,054 B2
(45) Date of Patent: May 12, 2026

(54) ANTENNA DEVICE

(71) Applicant: AUO Corporation, Hsinchu City (TW)

(72) Inventors: Zong-Long Jhang, Hsinchu City (TW); Hsiu-Yin Cheng, Hsinchu City (TW); Yi-Hui Lin, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 71 days.

(21) Appl. No.: 18/931,011

(22) Filed: Oct. 29, 2024

(65) Prior Publication Data

US 2025/0192435 A1 Jun. 12, 2025

Related U.S. Application Data

(60) Provisional application No. 63/606,806, filed on Dec. 6, 2023.

(30) Foreign Application Priority Data

Jun. 21, 2024 (TW) ................................ 113123075

(51) Int. Cl.
*H01Q 1/22* (2006.01)
*H01Q 1/48* (2006.01)
*H01Q 9/04* (2006.01)

(52) U.S. Cl.
CPC ............. *H01Q 9/0407* (2013.01); *H01Q 1/48* (2013.01)

(58) Field of Classification Search
CPC ........ H01Q 9/0407; H01Q 1/48; H01Q 1/364; H01Q 1/40; H01Q 9/0457; H01Q 21/065; H01Q 1/2283; H01Q 1/38; H01Q 1/12; H01Q 1/50
See application file for complete search history.

(56) References Cited

U.S. PATENT DOCUMENTS 10,985,451 B2 4/2021 Kim et al.
11,424,552 B2 8/2022 Chiu et al.
11,721,911 B2 8/2023 Chiu et al.
11,777,200 B2 10/2023 Kim et al.
12,088,011 B2 9/2024 Chiu et al.
2019/0280374 A1* 9/2019 Kim .................... H01Q 1/2283

(Continued)

FOREIGN PATENT DOCUMENTS

CN 112736407 4/2021
CN 112701444 6/2022

(Continued)

*Primary Examiner* — David E Lotter
(74) *Attorney, Agent, or Firm* — JCIPRNET

(57) ABSTRACT

A transparent antenna device includes a transparent substrate, an antenna electrode layer, an active device layer, a redistribution structure and a chip. The antenna electrode layer is located on the first surface of the transparent substrate and includes an antenna electrode located in a circuit layout region of the transparent antenna device. The active device layer is located above the second surface of the transparent substrate and includes an active device located in the circuit layout region. The redistribution structure is located on the active device layer and includes a signal line and a pad located in the circuit layout region. The chip is bonded to the pad of the redistribution structure and is located in the circuit layout region. The transparent antenna device has a light transmitting region located next to the circuit layout region.

10 Claims, 35 Drawing Sheets

(56) References Cited

U.S. PATENT DOCUMENTS

| | | | | |
|---|---|---|---|---|
| 2021/0226328 | A1* | 7/2021 | Kim | H01Q 1/2283 |
| 2023/0071946 | A1* | 3/2023 | Feng | H10W 44/20 |

FOREIGN PATENT DOCUMENTS

| | | |
|---|---|---|
| CN | 115732898 | 3/2023 |
| CN | 118431750 | 8/2024 |
| TW | 201640739 | 11/2016 |
| TW | 201939810 | 10/2019 |
| TW | 202215709 | 4/2022 |

* cited by examiner

ANTENNA DEVICE

CROSS-REFERENCE TO RELATED APPLICATION

This application claims the priority benefit of U.S. provisional application Ser. No. 63/606,806, filed on Dec. 6, 2023 and Taiwan application serial no. 113123075, filed on Jun. 21, 2024. The entirety of each of the above-mentioned patent applications is hereby incorporated by reference herein and made a part of this specification.

BACKGROUND

Technical Field

The present invention relates to an antenna device.

Description of Related Art

Wireless communication technology is used everywhere in modern life. For example, smartphones are usually equipped with wireless wide area network (WWAN), digital television broadcasting system (DTV), global positioning system (GPS), wireless local area network (WLAN), near field communication (NFC), long term evolution (LTE) and wireless personal network (WLPN) and other wireless communication technology systems. In addition, the provision of wireless local area network (WLAN) environments in major cities or public spaces has become an essential facility, and many people even establish their own WLANs at home.

Wireless communication devices use their built-in antennas to transmit or receive wireless signals. With the advancement of wireless communication technology, many manufacturers are committed to developing more efficient antenna devices.

SUMMARY

The present invention provides an antenna device, which has a light transmitting region, so users can see the landscape behind the antenna device through the antenna device.

At least one embodiment of the present invention provides a transparent antenna device, which includes a transparent substrate, an antenna electrode layer, an active device layer, a redistribution structure and a chip. The transparent substrate has a first surface and a second surface opposite the first surface. The antenna electrode layer is located on the first surface of the transparent substrate and includes an antenna electrode located in a circuit layout region of the transparent antenna device. The active device layer is located above the second surface of the transparent substrate and includes an active device located in the circuit layout region. The redistribution structure is located on the active device layer and includes a signal line and a pad located in the circuit layout region. The chip is bonded to the pad of the redistribution structure and is located in the circuit layout region. The transparent antenna device has a light transmitting region located next to the circuit layout region, and the light transmitting region has a transmittance of 35% to 85%.

DESCRIPTION OF THE EMBODIMENTS

Figure 1:
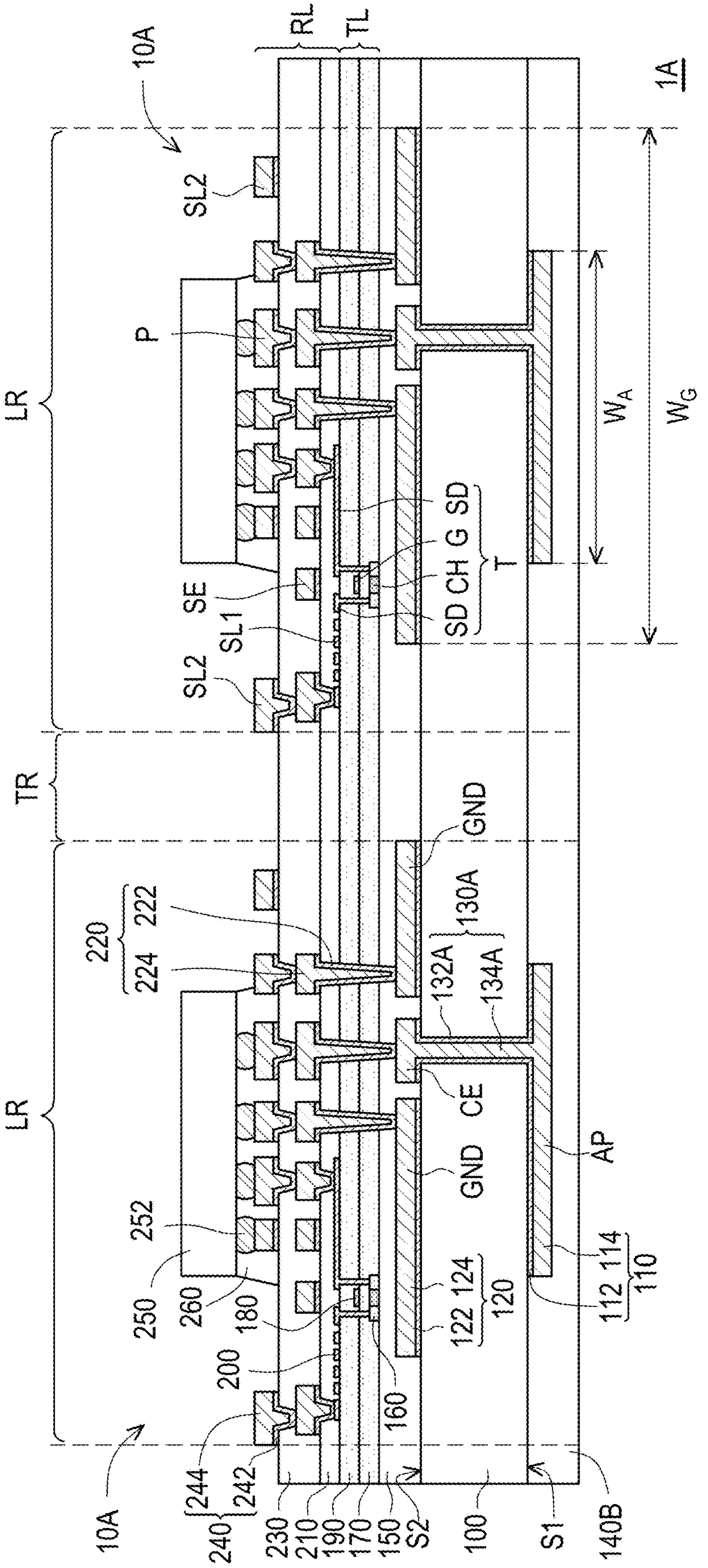
FIG. 1 is a schematic cross-sectional view of an antenna device according to an embodiment of the present invention.

FIG. 1 is a schematic cross-sectional view of an antenna device 1A according to an embodiment of the present invention. Referring to FIG. 1, the antenna device 1A includes a transparent substrate 100, an antenna electrode layer 110, an active device layer TL, a redistribution structure RL and a chip 250. In this embodiment, the antenna device 1A further includes a conductive layer 120, a protective layer 140B, a buffer layer 150 and an underfill material 260. The antenna device 1A has a circuit layout region LR and a light transmitting region TR. The circuit layout region LR includes chips and various wires, making it difficult for light to pass through the circuit layout region LR. In this embodiment, the light transmitting region TR does not contain any metal or other opaque materials, and the transmittance of the light transmitting region TR is 70% to 85%, but the invention is not limited thereto. In other embodiments, a metal mesh that allows light to penetrate is provided in the light transmitting region TR. In this embodiment, the overall visual transmittance of the circuit layout region LR and the light transmitting region TR is 25% to 55%.

The material of the transparent substrate 100 includes glass, organic polymer or other applicable materials. Examples of glass include Pyrex®, quartz (such as fused silica glass), soda-lime glass, aluminosilicate glass, borosilicate glass, aluminoborosilicate glass or other suitable materials or a combination of the above materials.

The transparent substrate 100 has a first surface S1 and a second surface S2 opposite to the first surface S1. In some embodiments, the thickness of the transparent substrate 100 is greater than or equal to 0.3 mm, preferably less than or equal to 0.7 mm.

The conductive through hole 130A is disposed in the transparent substrate 100 and extends from the first surface S1 to the second surface S2 of the transparent substrate 100. The conductive through hole 130A is located in the circuit layout region LR. In some embodiments, the material of the conductive through hole 130A includes copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials. In this embodiment, the conductive through hole 130A includes a seed layer 132A formed on the surface of the substrate through hole of the transparent substrate 100 and a metal layer 134A formed on the seed layer 132A, but the invention is not limited thereto. In other embodiments, the seed layer 132A may be omitted.

The antenna electrode layer 110 and the protective layer 140B are located on the first surface S1 of the transparent substrate 100. The materials of the antenna electrode layer 110 include copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials. In this embodiment, the antenna electrode layer 110 includes a seed layer 112 formed on the surface of the transparent substrate 100 and a metal layer 114 formed on the seed layer 112, but the invention is not limited thereto. In other embodiments, the seed layer 112 may be omitted. The antenna electrode layer 110 includes an antenna electrode AP located in the circuit layout region LR.

The protective layer 140B covers the antenna electrode layer 110. The protective layer 140B can be used to protect the antenna electrode layer 110 to prevent the antenna electrode layer 110 from being oxidized or damaged during the manufacturing process. In some embodiments, the protective layer 140B includes organic materials (such as polyimide, epoxy resin, etc.) or inorganic materials (such as silicon nitride, silicon oxide, etc.) or other suitable materials or combinations of the above materials.

The conductive layer 120, the buffer layer 150, the active device layer TL, the redistribution structure RL, the underfill material 260 and the chip 250 are located above the second surface S2 of the transparent substrate 100.

The conductive layer 120 and the buffer layer 150 are located between the second surface S2 of the transparent substrate 100 and the active device layer TL. The material of the conductive layer 120 include copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials. In this embodiment, the conductive layer 120 includes a seed layer 122 formed on the surface of the transparent substrate 100 and a metal layer 124 formed on the seed layer 122, but the invention is not limited thereto. In other embodiments, the seed layer 122 may be omitted.

The conductive layer 120 includes a ground electrode GND and a connection electrode CE located in the circuit layout region LR. The ground electrode GND at least partially overlaps the antenna electrode AP, and the ground electrode GND surrounds the connection electrode CE.

In some embodiments, the connection electrode CE is electrically connected to the antenna electrode AP through the conductive through hole 130A. In some embodiments, the width $W_G$ of the ground electrode GND is greater than the width $W_A$ of the antenna electrode AP.

The buffer layer 150 covers the conductive layer 120. In some embodiments, the buffer layer 150 includes organic materials (such as polyimide, etc.) or inorganic materials (such as silicon nitride, silicon oxide, etc.) or a combination of the above materials.

The active device layer TL is located on the buffer layer 150 and includes the active device T located in the circuit layout region LR. In this embodiment, the active device layer TL includes a semiconductor layer 160, a first dielectric layer 170, a first wire layer 180, a second dielectric layer 190 and a second wire layer 200.

The semiconductor layer 160 is located on the buffer layer 150. The semiconductor layer 160 has a single-layer structure or a multi-layer structure, which includes amorphous silicon, polysilicon, microcrystalline silicon, single crystal silicon, organic semiconductor materials, oxide semiconductor materials (for example: indium zinc oxide, indium gallium zinc oxide or be other suitable materials, or combinations of the above materials) or other suitable materials, or combinations of the above materials. In this embodiment, the semiconductor layer 160 includes a plurality of semiconductor channel structures CH.

The first dielectric layer 170 is located on the semiconductor layer 160.

The first wire layer 180 is located on the first dielectric layer 170 and includes a plurality of gate electrodes G overlapping the semiconductor channel structures CH. In FIG. 1, the gate electrode G in the first wire layer 180 is shown, but the present invention is not limited to the first wire layer 180 only including the gate electrode G. In some embodiments, in addition to the gate electrode G, the first wire layer 180 also includes other conductive structures.

The second dielectric layer 190 is located on the first wire layer 180 and the first dielectric layer 170 and covers the gate electrode G.

The second wire layer 200 is located on the second dielectric layer 190 and includes multiple source/drain electrodes SD and multiple signal lines SL1. The source/drain electrodes SD pass through the first dielectric layer 170 and the second dielectric layer 190 and is electrically connected to the corresponding semiconductor channel structure CH. Each active device T includes a corresponding semiconductor channel structure CH, a corresponding gate electrode G, and corresponding source/drain electrodes SD. In some embodiments, the digital signals required by chip 250 are transmitted through signal line SL1.

In some embodiments, the active device layer TL includes various active devices T, and these active devices T, which cooperate with each other to form a circuit. By configuring the circuit within the active device layer TL, the circuitry required to be placed on the chip can be reduced, thereby reducing the chip size and cost.

In some embodiments, the materials of the first dielectric layer 170 and the second dielectric layer 190 include organic polymers (such as polyimide, etc.) or inorganic materials (such as silicon oxide, silicon nitride, silicon oxynitride, aluminum oxide, zirconium oxide, hafnium oxide or other suitable materials or combinations of the above materials). In some embodiments, the materials of the first wire layer 180 and the second wire layer 200 include copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials.

The redistribution structure RL is located on the active device layer TL. In this embodiment, the redistribution structure RL includes a first organic insulating layer 210, a first redistribution layer 220, a second organic insulating layer 230 and a second redistribution layer 240.

The first organic insulating layer 210 is located on the second dielectric layer 190 of the active device layer TL.

The first redistribution layer 220 is located on the first organic insulating layer 210. In some embodiments, part of the first redistribution layer 220 passes through the first organic insulating layer 210 and is electrically connected to the second wire layer 200 of the active device layer TL, and another part of the first redistribution layer 220 passes through the first organic insulating layer 210, insulating layer 210, active device layer TL and buffer layer 150, and is electrically connected to the ground electrode GND and the connection electrode CE of the conductive layer 120. In some embodiments, the first redistribution layer 220 further includes a shielding electrode SE overlapping the active device T. In some embodiments, a ground signal is applied to the shielding electrode SE, which can reduce interference from external signals to the active device T.

The materials of the first redistribution layer 220 include copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials. In this embodiment, the first redistribution layer 220 includes a seed layer 222 and a metal layer 224 formed on the seed layer 222, but the invention is not limited thereto.

The second organic insulating layer 230 is located on the first organic insulating layer 210 and the first redistribution layer 220.

The second redistribution layer 240 is located on the second organic insulating layer 230 and includes a signal line SL2 and a pad P located in the circuit layout region LR. In some embodiments, a portion of the second redistribution layer 240 passes through the second organic insulating layer 230 and is electrically connected to the first redistribution layer 220. In some embodiments, the signal line SL2 includes, for example, a DC voltage line, a radio frequency (RF) signal input line, an RF signal output line, etc.

The materials of the second redistribution layer 240 include copper (Cu), aluminum (Al), gold (Au), silver (Ag), titanium (Ti), nickel (Ni), tungsten (W), conductive oxide (such as indium tin oxide, indium zinc oxide, etc.) or other suitable materials or combinations of the above materials. In this embodiment, the second redistribution layer 240 includes a seed layer 242 and a metal layer 244 formed on the seed layer 242, but the invention is not limited thereto.

In some embodiments, the material of the second organic insulating layer 230 includes polyimide or other suitable materials, and it has high transmittance and low dissipation factor (Df). For example, the transmittance of the second organic insulating layer 230 for light with a wavelength of 400 nm to 800 nm is greater than 90%. In some embodiments, the dielectric constant (Dk) of the second organic insulating layer 230 is less than 4, and the dissipation factor is less than 0.004. In some embodiments, the first redistribution layer 220 and/or the second redistribution layer 240 include signal lines for transmitting high-frequency RF signals, and the use of the second organic insulating layer 230 with a greater thickness and low dissipation factor helps reduce signal loss during high-frequency operations. In some embodiments, the thickness of the second organic insulating layer 230 is greater than the thickness of the first dielectric layer 170 and the thickness of the second dielectric layer 190 in the active device layer TL. For example, the thickness of the second organic insulating layer 230 is between 50 micrometers and 100 micrometers, while the thicknesses of the first dielectric layer 170 and the second dielectric layer 190 range from 30 nanometers to 500 nanometers. In some embodiments, the first organic insulating layer 210 is formed using a coating method, with a thickness of less than 3 micrometers, and it serves as a planarization layer for the second wiring layer 200. In some embodiments, the thicknesses of the first redistribution layer 220 and the second redistribution layer 240 in the redistribution structure RL are greater than the thicknesses of the first wiring layer 180 and the second wiring layer 200 in the active device layer TL.

The chip 250 is located in the circuit layout region LR and is bonded to the pad P of the redistribution structure RL through surface-mount technology (SMT). In some embodiments, the ground electrode GND, the connection electrode CE, and the active device T are electrically connected to the chip 250.

In some embodiments, the chip 250 is bonded to the pad P through a conductive connection structure 252. The conductive connection structure 252 is, for example, solder, conductive glue or other suitable structures. In some embodiments, the underfill material 260 is located between the chip 250 and the redistribution structure RL and surrounds the joint between the chip 250 and the redistribution structure RL (i.e., conductive connection structure 252). In some embodiments, the underfill material 260 may include a thermal interface material (TIM) to facilitate heat dissipation of the chip 250. For example, the thermal conductivity of the underfill material 260 is greater than 0.3 W/Mk.

In some embodiments, the chip 250 includes a beamformer integrated circuit (BFIC) or other active/passive devices.

The antenna device 1A includes a plurality of antenna units 10A arranged in an array. The manufacturing method of the antenna unit 10A in the antenna device 1A will be described below with reference to FIGS. 2A to 2L.

Figure 2A:
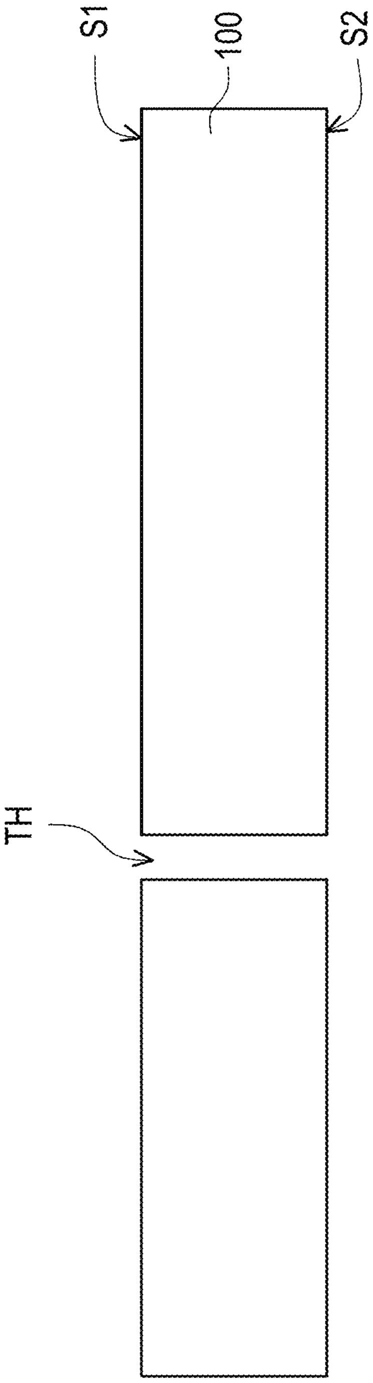
FIGS. 2A to 2L are schematic cross-sectional views of various stages of the manufacturing process of an antenna unit according to an embodiment of the present invention.

Referring to FIG. 2A, a transparent substrate 100 is provided. The transparent substrate 100 is drilled to have a through hole TH extending from the first surface S1 to the second surface S2. In some embodiments, the method of forming the through hole TH includes laser ablation, wet etching, dry etching, excimer laser ablation or other suitable methods or combinations of the above methods. In this embodiment, the through hole TH includes side walls perpendicular to the first surface S1 and the second surface S2, but the invention is not limited thereto. In other embodiments, the through hole TH includes sloped sidewalls. For example, the shape of the through hole TH may be a straight trapezoid or an inverted trapezoid.

Figure 2B:
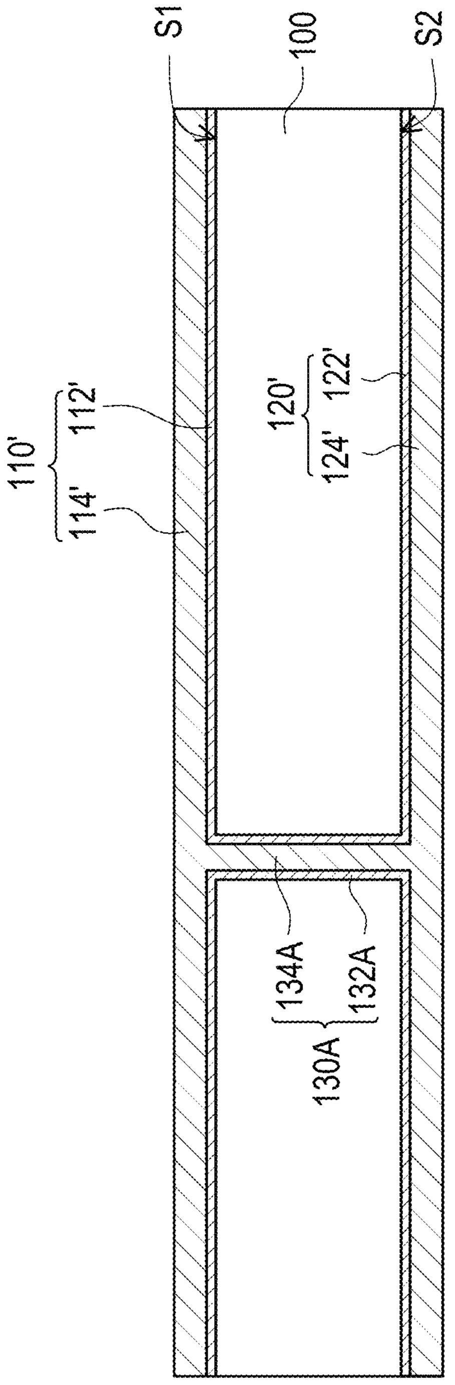

Referring to FIG. 2B, a conductive material is deposited on the transparent substrate 100. The conductive material layer 110' and the conductive material layer 120' are formed on the first surface S1 and the second surface S2 respectively, and the conductive through hole 130A is formed in the through hole TH.

For example, by sputtering, chemical plating, or other suitable processes, seed material layers 112' and 122' are respectively formed on the first surface S1 and the second surface S2 of the transparent substrate 100, and a seed layer 132A is formed within the through hole TH. Next, an electroplating process is used to form metal material layers 114', 124' and metal layer 134A on the seed material layers 112', 122' and the seed layer 132A respectively. In other embodiments, the seed material layers 112', 122' and the seed layer 132A can be omitted, and the conductive material layer 110', the conductive material layer 120' and the conductive through hole 130A can be formed by electroless plating, physical vapor deposition (such as sputtering, thermal evaporation, e-beam evaporation, etc.), chemical vapor deposition, atomic layer deposition or other suitable methods or combinations of the above methods. In other embodiments, the conductive material layer 110', the conductive material layer 120', and the conductive through hole 130A may include cured conductive glue. The conductive material layers 110' and 120' can be formed by processes such as coating, printing, etc., while the conductive through hole 130A can be formed by a hole-filling process. In some embodiments, the materials of the conductive material layer 110' and the conductive material layer 120' may be different from the material of the conductive through hole 130A. When the conductive material layer 110' and the conductive material layer 120' are formed using a printing process, the subsequent patterning process for the conductive material layers 110' and 120' can be omitted.

Figure 2C:
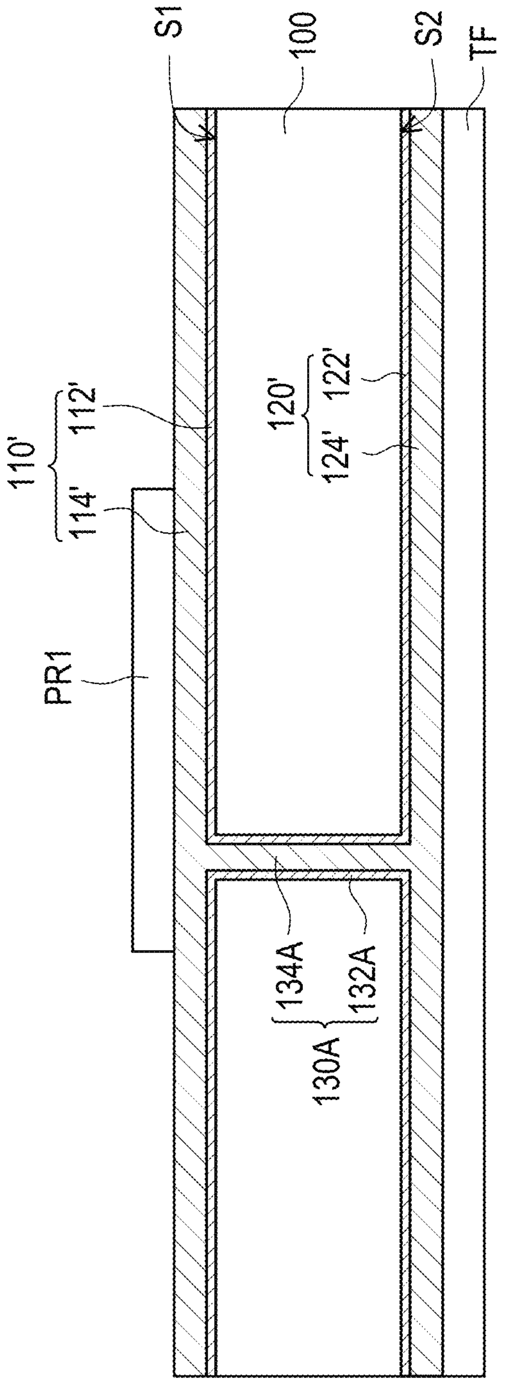

Referring to FIG. 2C, a temporary film TF is attached to the conductive material layer 120', and a photoresist pattern layer PR1 is formed on the conductive material layer 110'.

Figure 2D:
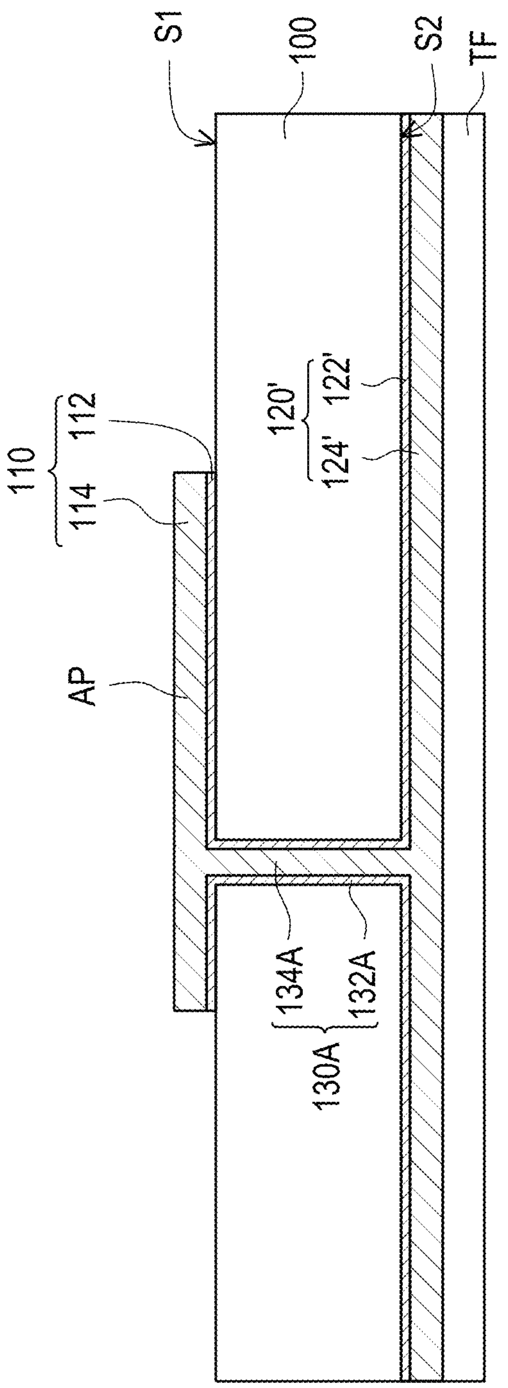

Referring to FIG. 2D, the conductive material layer 110' is etched using the photoresist pattern layer PR1 as a mask to form the antenna electrode layer 110 including the antenna electrode AP. After performing the etching process, the photoresist pattern layer PR1 is removed through an ashing process, a lift-off process or other suitable processes.

Figure 2E:
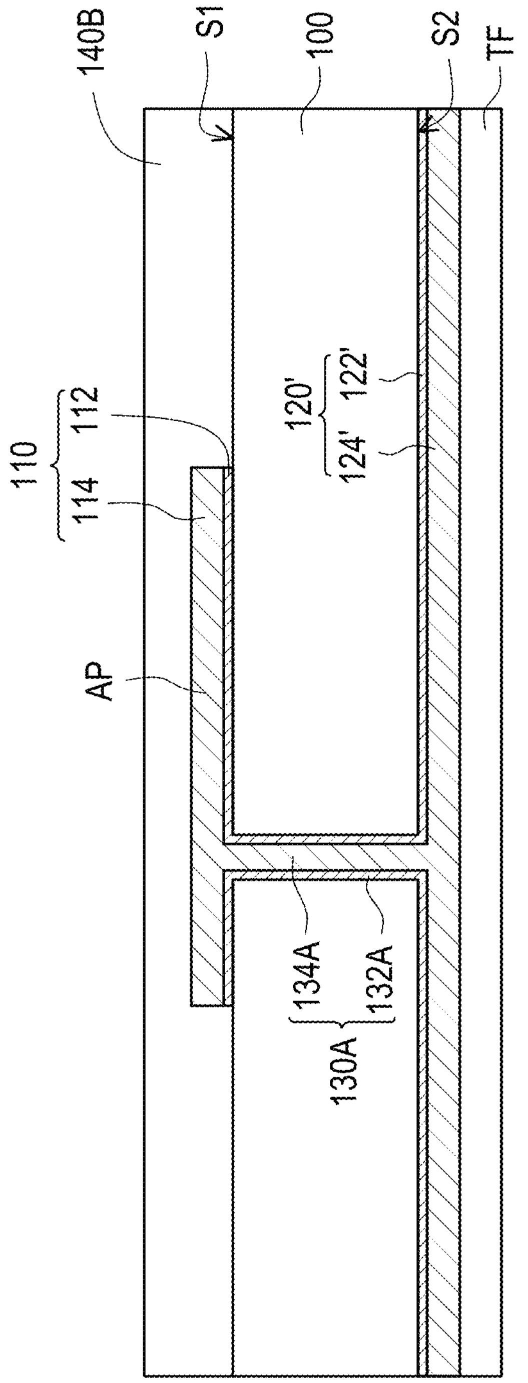

Referring to FIG. 2E, a protective layer 140B is formed on the antenna electrode layer 110.

Figure 2F:
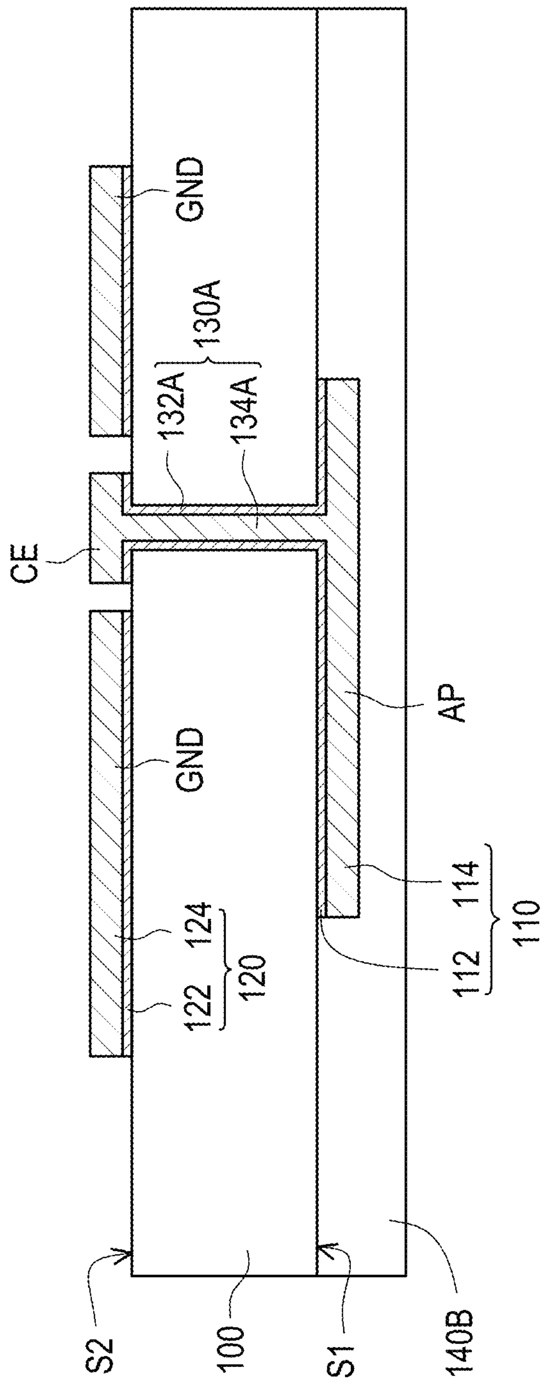

Referring to FIG. 2F, the temporary film TF is removed, and the conductive material layer 120' is patterned to obtain the ground electrode GND and the connection electrode CE. For example, a photoresist pattern layer (not shown) is formed on the conductive material layer 120', and the conductive material layer 120' is etched using the photoresist pattern layer as a mask. Then, the photoresist pattern layer is removed through an ashing process, a lift-off process or other suitable processes.

Figure 2G:
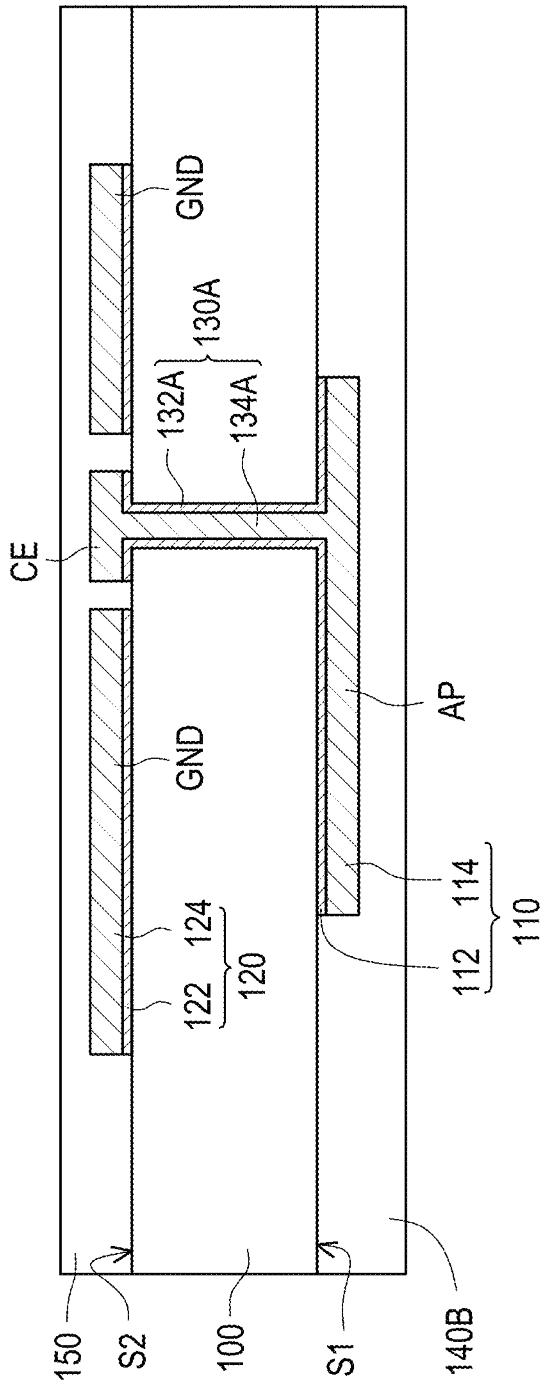

Referring to FIG. 2G, the buffer layer 150 is formed on the ground electrode GND and the connection electrode CE.

Figure 2H:
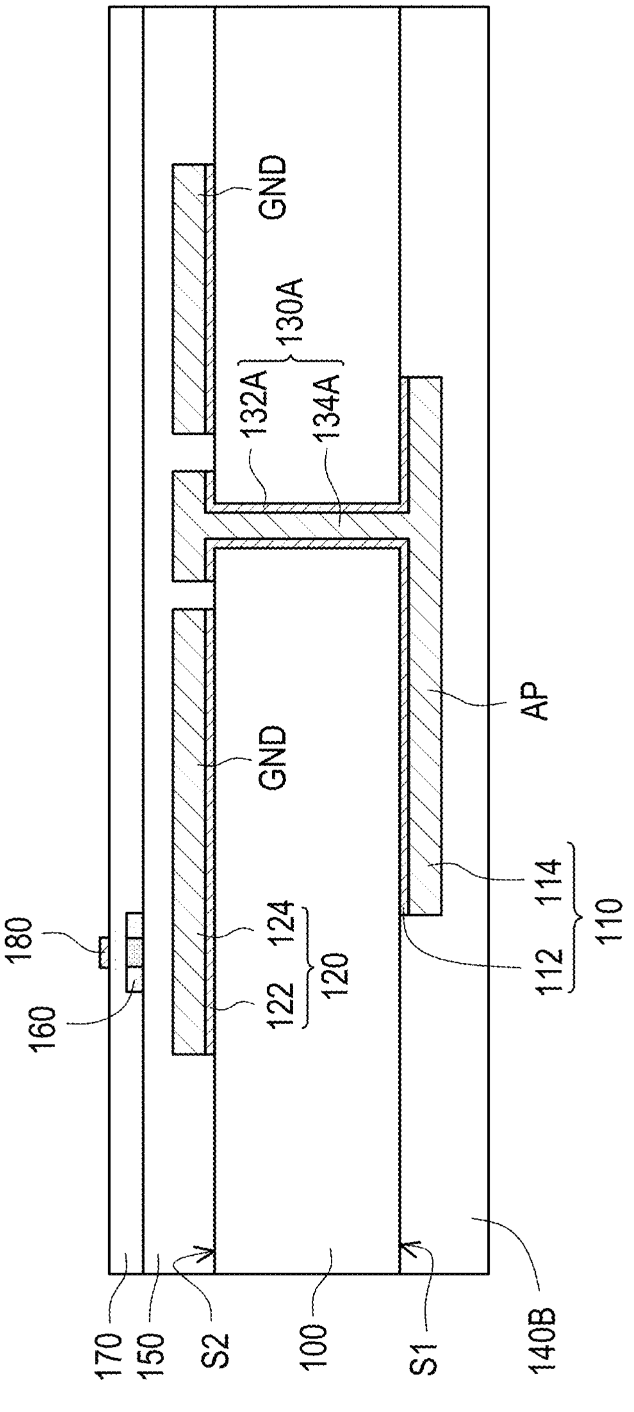

Referring to FIG. 2H, the semiconductor layer 160, the first dielectric layer 170 and the first wire layer 180 are formed above the buffer layer 150. In some embodiments, the semiconductor layer 160, the first dielectric layer 170 and the first wire layer 180 are formed by physical vapor deposition, chemical vapor deposition, atomic layer deposition or other suitable processes. In some embodiments, the semiconductor layer 160 is optionally doped through an ion implantation process or other suitable processes.

Figure 2I:
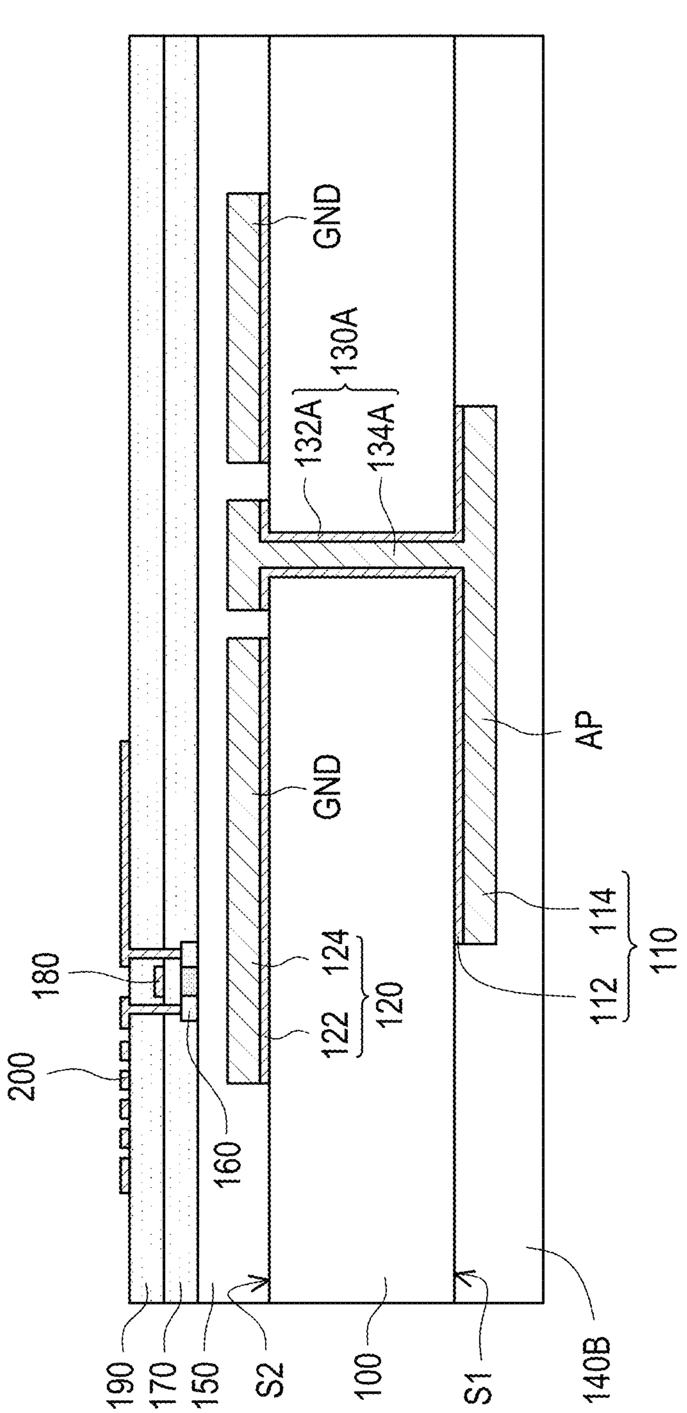

Referring to FIG. 2I, a second dielectric layer 190 and a second wire layer 200 are formed above the first dielectric layer 170. In some embodiments, the second dielectric layer 190 and the second wire layer 200 are formed by physical vapor deposition, chemical vapor deposition, atomic layer deposition or other suitable processes.

Figure 2J:
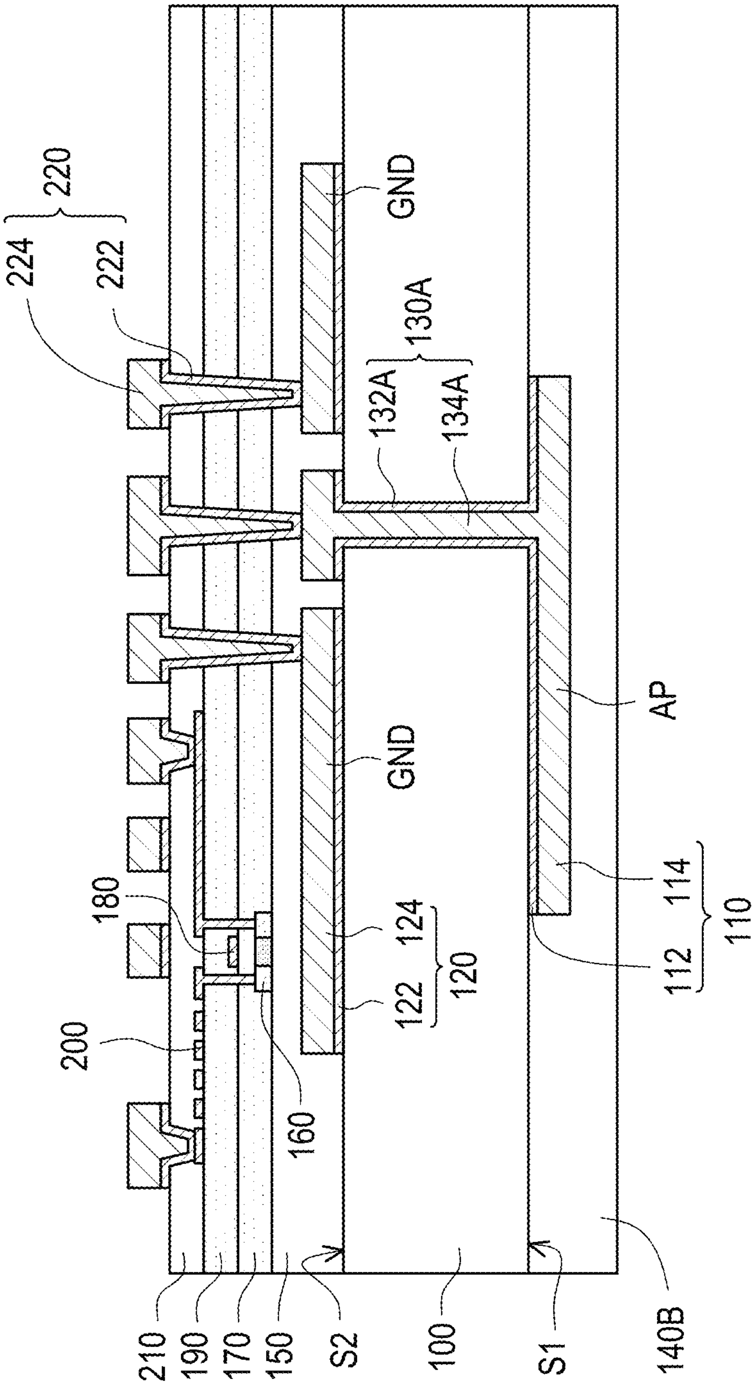

Referring to FIG. 2J, a first organic insulating layer 210 is formed above the second dielectric layer 190 and the second wire layer 200. Then, multiple openings are formed in the first organic insulating layer 210 through laser drilling or other suitable processes, and some openings also extend through the second dielectric layer 190, the first dielectric layer 170 and the buffer layer 150. Then, the first redistribution layer 220 is formed on the surface of the first organic insulating layer 210 and the aforementioned openings.

For example, a blanket seed material layer (not shown) is first formed on the surface of the first organic insulating layer 210 and in the aforementioned openings. Next, a photoresist pattern layer (not shown) is formed on the seed material layer. A metal layer 224 is formed on the portion of the seed material layer exposed by the photoresist pattern layer using an electroplating process. Then, the photoresist pattern layer and the seed material layer underneath it are removed. The remaining seed material layer becomes the seed layer 222.

Figure 2K:
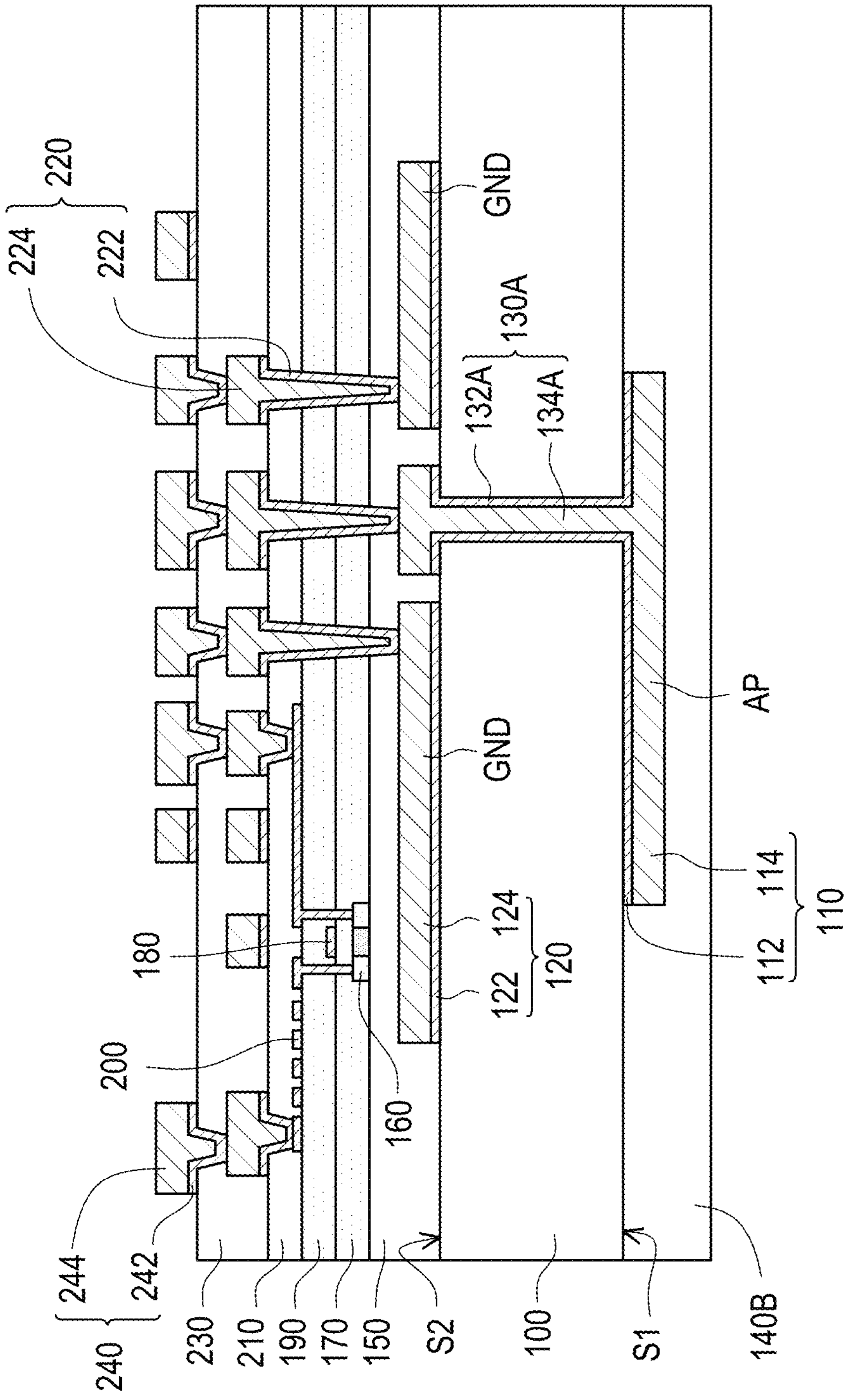

Referring to FIG. 2K, the second organic insulating layer 230 is formed on the first organic insulating layer 210. In some embodiments, the method for forming the second organic insulating layer 230 includes attaching a dry film to the first organic insulating layer 210 or coating a liquid organic material (such as liquid polyimide (PI) material) onto the first organic insulating layer 210.

Then, multiple openings are formed in the second organic insulating layer 230 through laser drilling or other suitable processes. Then, the second redistribution layer 240 is formed on the surface of the second organic insulating layer 230 and in the aforementioned openings.

For example, a blanket seed material layer (not shown) is first formed on the surface of the second organic insulating layer 230 and the openings of the second organic insulating layer 230. Next, a photoresist pattern layer (not shown) is formed on the seed material layer. A metal layer 244 is formed on the portion of the seed material layer exposed by the photoresist pattern layer using an electroplating process. Then, the photoresist pattern layer and the seed material layer underneath it are removed. The remaining seed material layer becomes the seed layer 222.

Figure 2L:
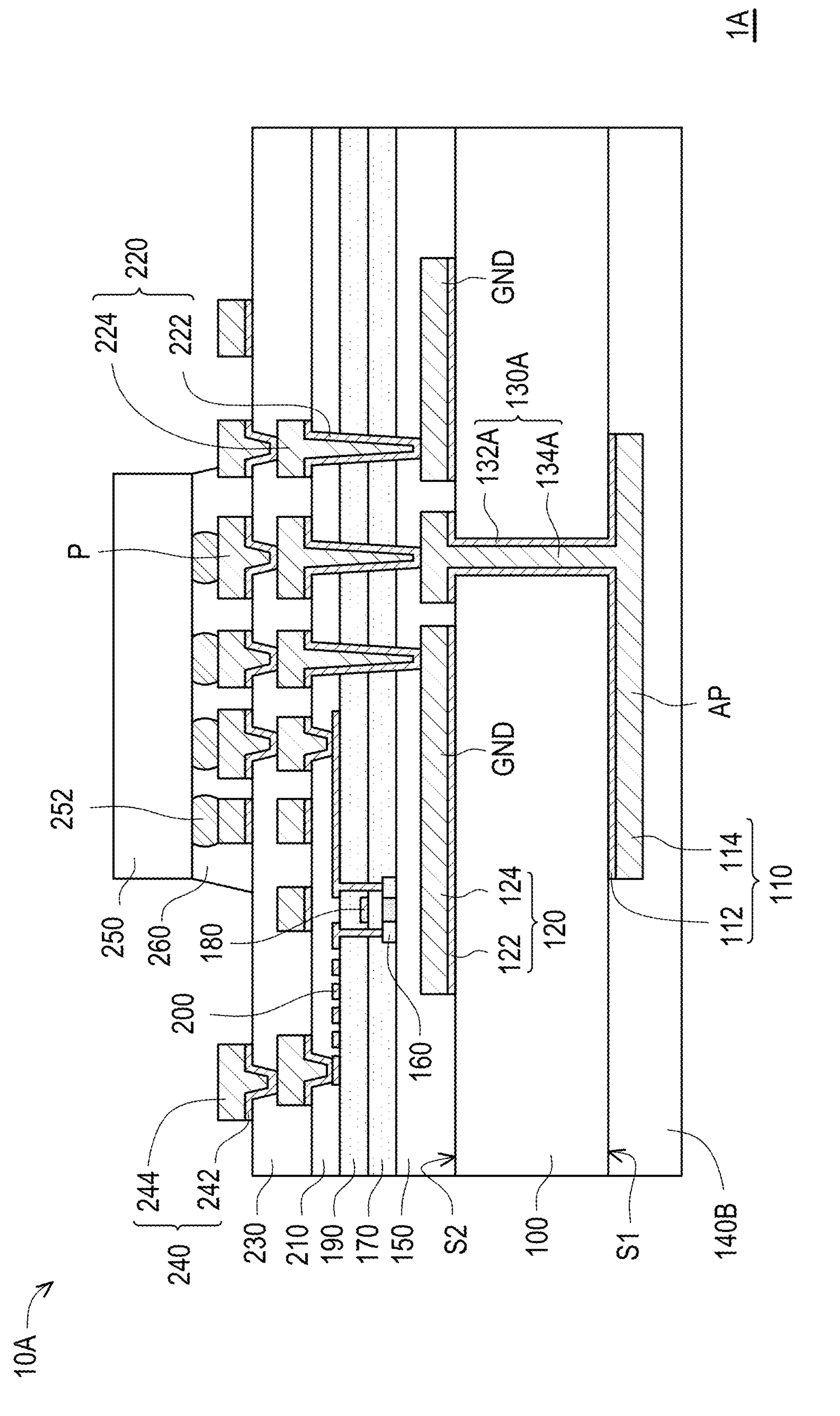

Finally, referring to FIG. 2L, the chip 250 is bonded to the second redistribution layer 240, and the underfill material 260 is formed between the chip 250 and the second redistribution layer 240. In some embodiments, the surface of the pad P can undergo treatments such as electroless nickel immersion gold (ENIG) or immersion silver plating to improve the yield of the chip bonding process. In some embodiments, prior to the chip bonding process, an organic material such as an organic solderability preservative (OSP) film can be formed on the pad P to protect the metal pad from rusting (e.g., sulfide or oxidation) due to exposure to air, thereby enhancing the yield of the chip bonding process.

Figure 3A:
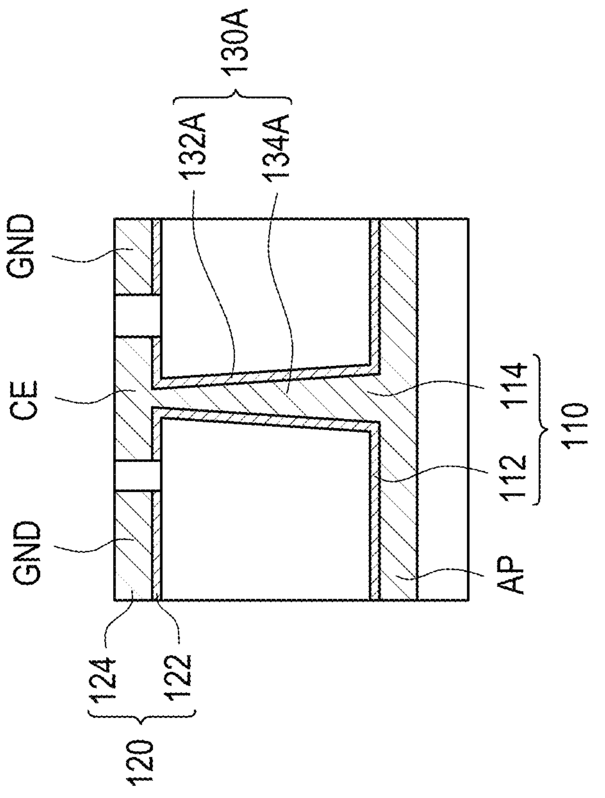
FIG. 3A is a schematic partial cross-sectional view of an antenna device according to an embodiment of the present invention.
Figure 3B:
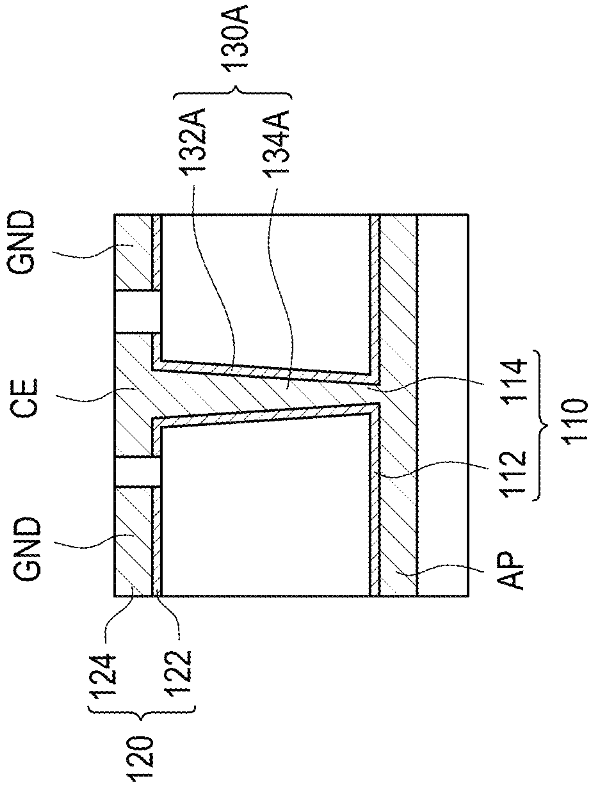
FIG. 3B is a schematic partial cross-sectional view of an antenna device according to an embodiment of the present invention.

FIG. 3A is a schematic partial cross-sectional view of an antenna device according to an embodiment of the present invention. The antenna device of FIG. 3A is similar to the antenna device 1A of FIG. 1, with the difference being that in the embodiment of FIG. 3A, the width of the conductive via 130A on the side near the antenna electrode AP is different from the width of the conductive via 130A on the side near the connection electrode CE. In the embodiment of FIG. 3A, the width of the conductive via 130A on the side near the antenna electrode AP is greater than the width of the conductive via 130A on the side near the connection electrode CE, but the present invention is not limited thereto. In other embodiments, the width of the conductive via 130A on the side near the antenna electrode AP may be less than the width of the conductive via 130A on the side near the connection electrode CE, as shown in FIG. 3B.

Figure 4:
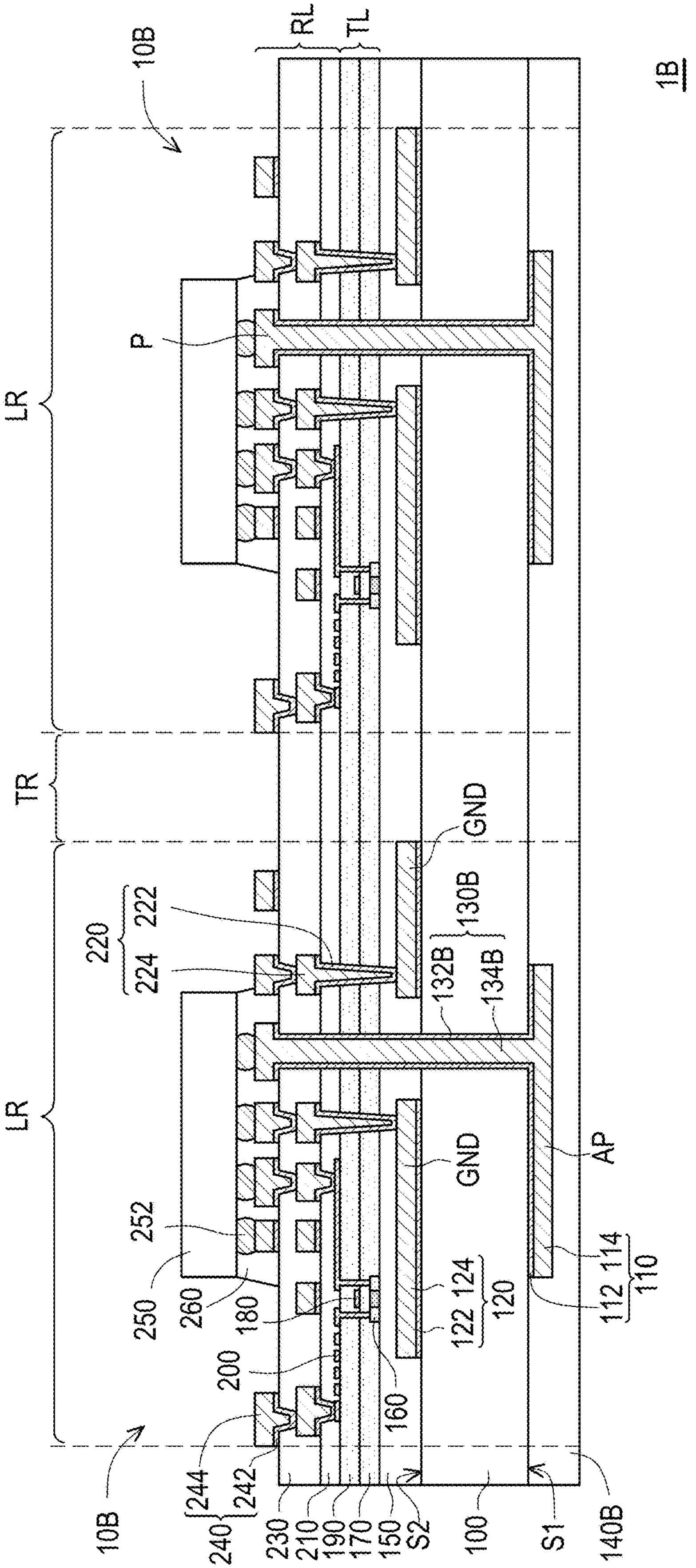
FIG. 4 is a schematic cross-sectional view of an antenna device according to an embodiment of the present invention.

FIG. 4 is a schematic cross-sectional view of an antenna device 1B according to an embodiment of the present invention. It should be noted that the embodiment in FIG. 4 follows the component designations and some content from the embodiment in FIG. 1, where the same or similar designations are used to indicate the same or similar components, and descriptions of the same technical content are omitted. For explanations of the omitted parts, please refer to the aforementioned embodiments, which will not be repeated here.

The difference between the antenna device 1B of FIG. 4 and the antenna device 1A of FIG. 1 is that in the antenna device 1B, the conductive through hole 130B and the antenna electrode layer 110 are formed after the second organic insulating layer 230 is formed. The conductive through hole 130B passes through the second organic insulating layer 230, the first organic insulating layer 210, the second dielectric layer 190, the first dielectric layer 170, the buffer layer 150 and the transparent substrate 100, and extends from the pad P of the redistribution structure RL to the first surface S1 of the transparent substrate 100, so as to electrically connect to the pad P and the antenna electrode AP.

The antenna device 1B includes a plurality of antenna units 10B in an array. The manufacturing method of the antenna units 10B in the antenna device 1B will be described below with reference to FIGS. 5A to 5H.

Figure 5A:
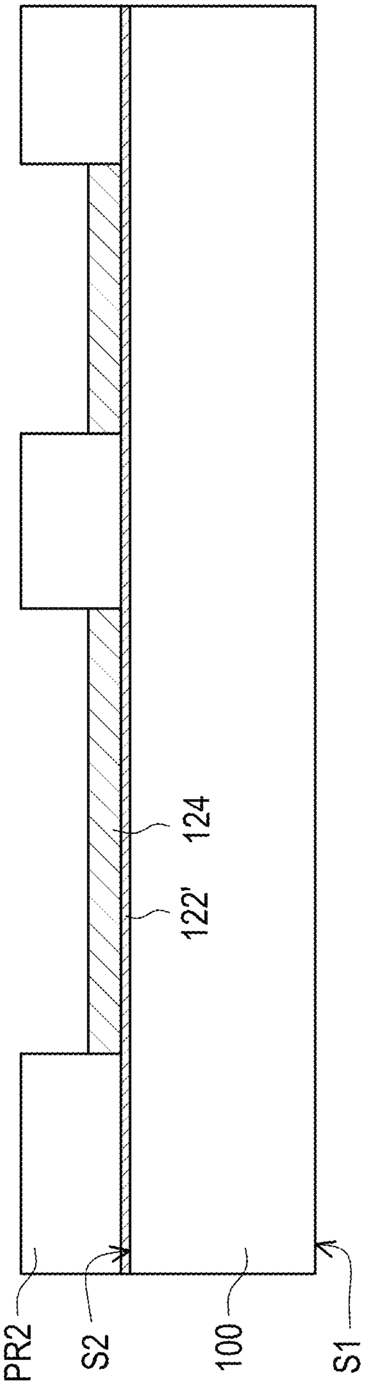
FIGS. 5A to 5H are schematic cross-sectional views of various stages of the manufacturing process of an antenna unit according to an embodiment of the present invention.

Referring to FIG. 5A, a blanket seed material layer 122' is first formed on the second surface S2 of the transparent substrate 100 through sputtering, chemical plating or other suitable processes. Next, a photoresist pattern layer PR2 is formed on the seed material layer 122'. The metal layer 124 is formed on the portion of the seed material layer 122' exposed by the photoresist pattern layer using an electroplating process.

Figure 5B:
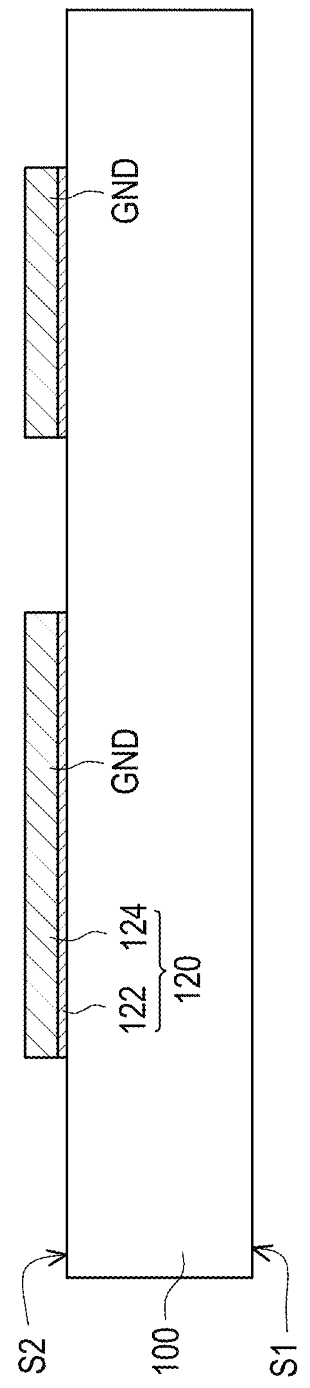

Next, referring to FIG. 5B, the photoresist pattern layer PR2 and the seed material layer located below it are removed. The remaining seed material layer is referred to as the seed layer 122. In other embodiments, the step of forming the seed material layer 112' may be omitted, and the conductive layer 120 can be formed using techniques such as chemical plating, physical vapor deposition (e.g., sputtering, thermal evaporation, electron beam evaporation, etc.), chemical vapor deposition, atomic layer deposition, or combinations thereof.

Figure 5C:
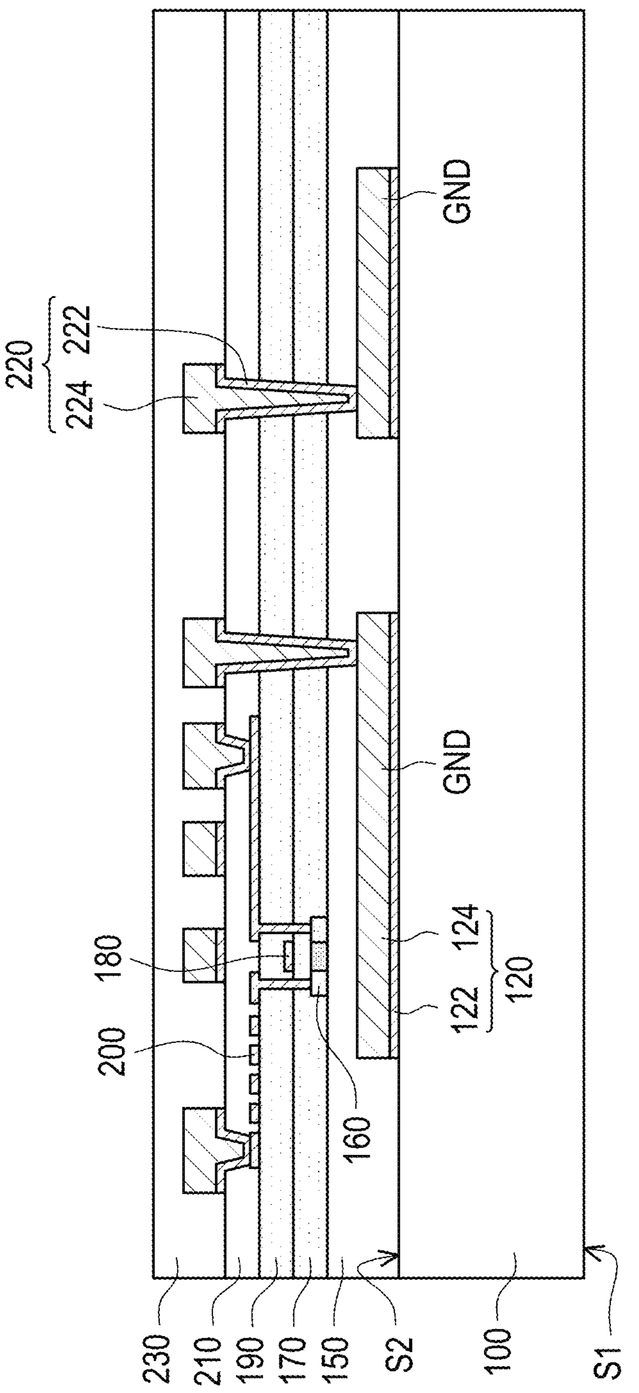

Referring to FIG. 5C, a buffer layer 150, a semiconductor layer 160, a first dielectric layer 170, a first wire layer 180, a second dielectric layer 190, a second wire layer 200, a first organic insulating layer 210, a first redistribution layer 220, and the second organic insulating layer 230 are formed. The formation method of the foregoing layers is similar to the embodiment of FIGS. 2G to 2K, and will not be described again here.

Figure 5D:
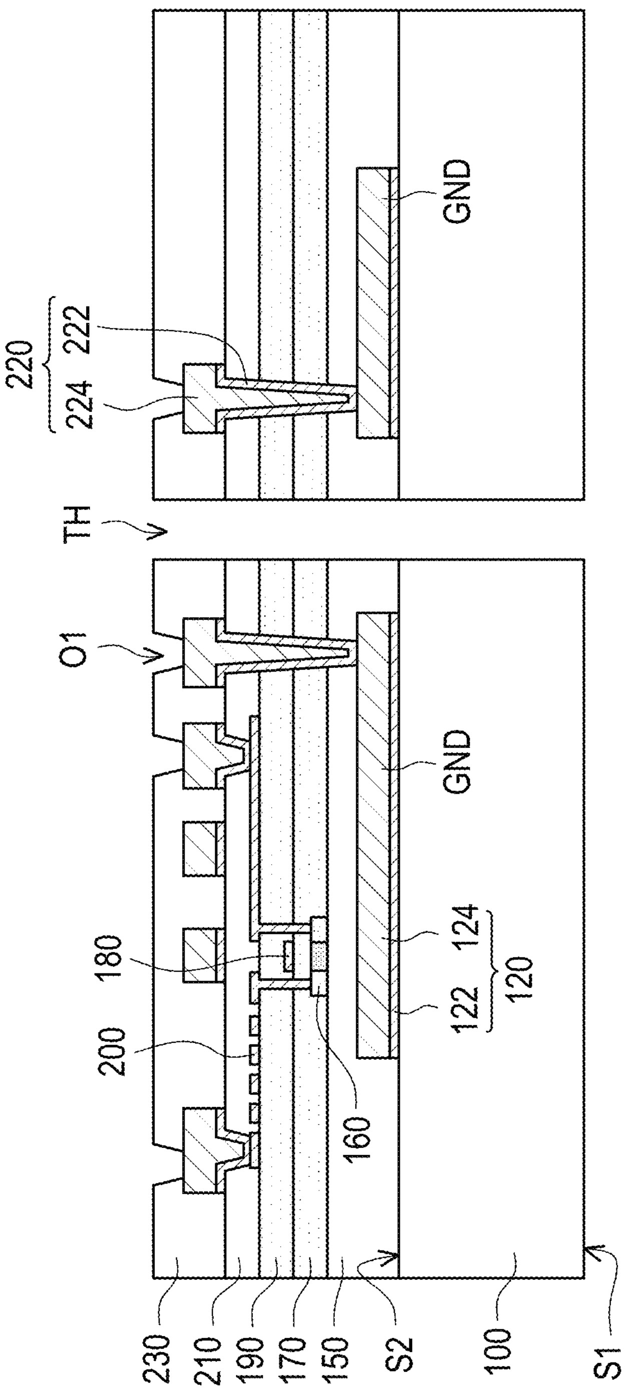

Referring to FIG. 5D, after the second organic insulating layer 230 is formed, a drilling process is performed to form a plurality of openings O1 in the second organic insulating layer 230 that exposes the first redistribution layer 220. In addition, the through hole TH passing through the second organic insulating layer 230, the first organic insulating layer 210, the second dielectric layer 190, the first dielectric layer 170, the buffer layer 150 and the transparent substrate 100 are also formed. The drilling process includes, for example, laser ablation, wet etching, dry etching, excimer laser ablation, or other suitable methods or a combination of the above methods.

Figure 5E:
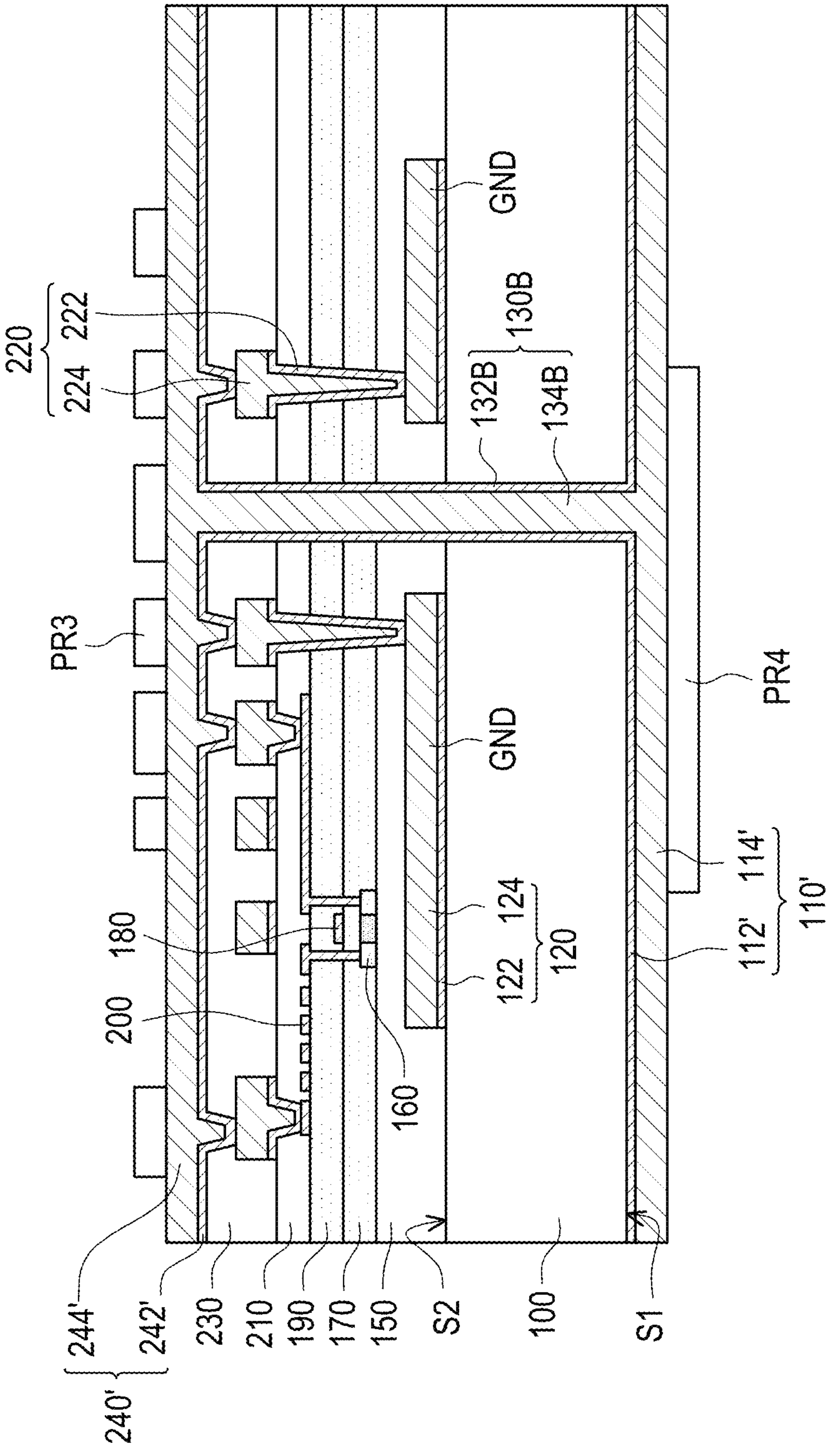

Referring to FIG. 5E, a conductive material is deposited on the second organic insulating layer 230 and the transparent substrate 100. The conductive material layer 110' and the conductive material layer 240' are respectively formed on the first surface S1 of the transparent substrate 100 and the second organic insulating layer 230, and the conductive through hole 130B is formed in the through hole TH. The conductive through hole 130B passes through the redistribution structure RL, the active device layer TL, the buffer layer 150 and the transparent substrate 100.

For example, by sputtering, chemical plating or other suitable processes, the seed material layers 112' and 242' are respectively formed on the first surface S1 of the transparent substrate 100 and the second organic insulating layer 230, and the seed layer 132B is formed in the through hole TH. Next, an electroplating process is used to form metal material layers 114', 244' and metal layer 134B on the seed material layers 112', 242' and the seed layer 132B, respectively. In other embodiments, the seed material layers 112', 242' and the seed layer 132B can be omitted, and the conductive material layer 110', the conductive material layer 240' and the conductive through hole 130B can be formed by electroless plating, physical vapor deposition (such as sputtering, thermal evaporation, e-beam evaporation, etc.), chemical vapor deposition, atomic layer deposition or combinations thereof. In other embodiments, the conductive material layer 110', the conductive material layer 240' and the conductive through hole 130B may include cured conductive glue. The conductive material layers 110' and 240' can be formed by processes such as coating, printing, etc., while the conductive through hole 130B can be formed by a hole-filling process. In some embodiments, the materials of the conductive material layer 110' and the conductive material layer 240' may be different from the material of the conductive through hole 130B. When the conductive material layer 110' and the conductive material layer 240' are formed using a printing process, the subsequent patterning process for the conductive material layers 110' and 240' can be omitted.

A photoresist pattern layer PR3 is formed on the conductive material layer 240', and a photoresist pattern layer PR4 is formed on the conductive material layer 110'.

Figure 5F:
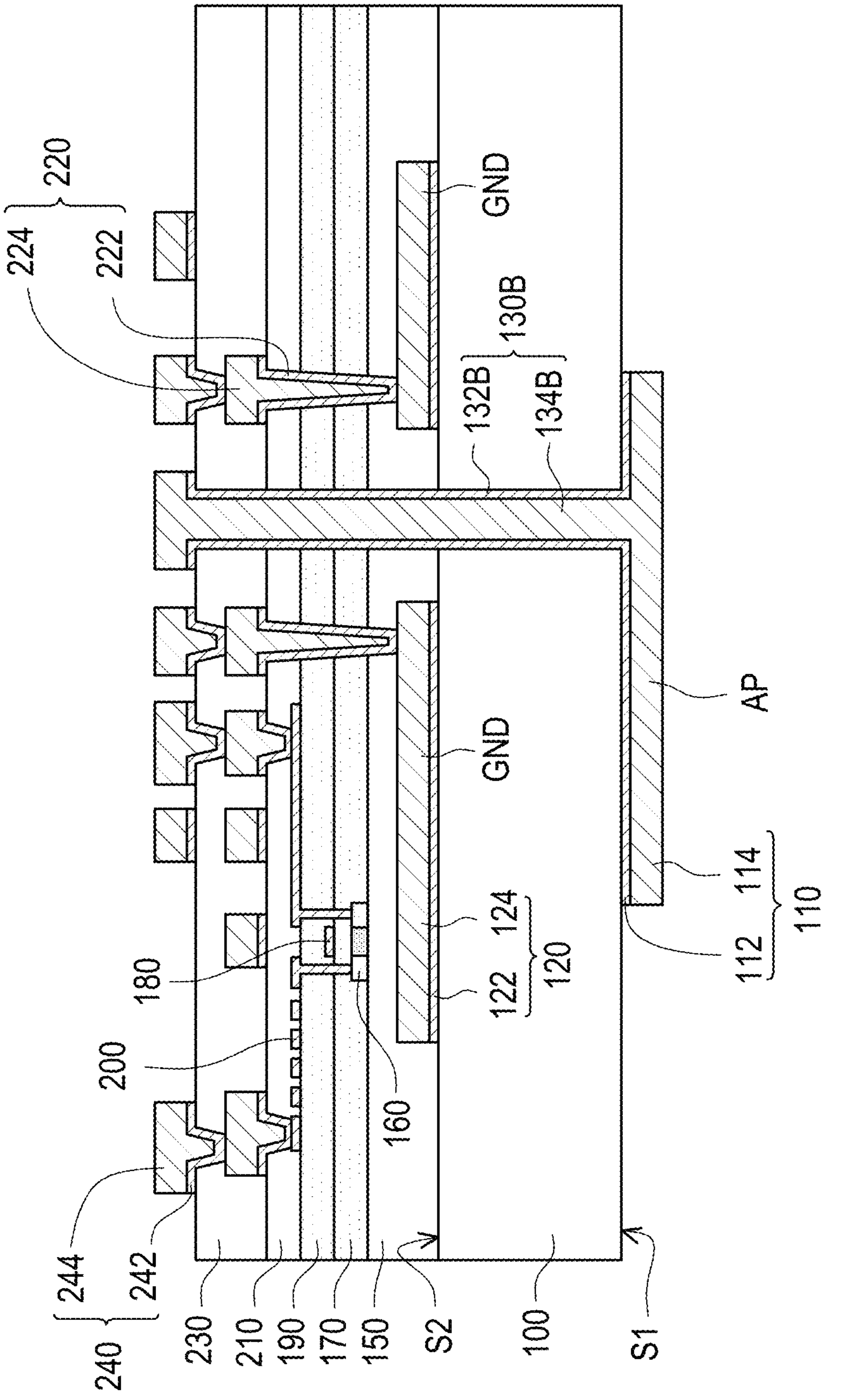

Referring to FIG. 5F, using the photoresist pattern layer PR3 and the photoresist pattern layer PR4 as a mask, an etching process is performed on the conductive material layer 240' and the conductive material layer 110' to form the antenna electrode layer 110 and the second redistribution layer 240.

Figure 5G:
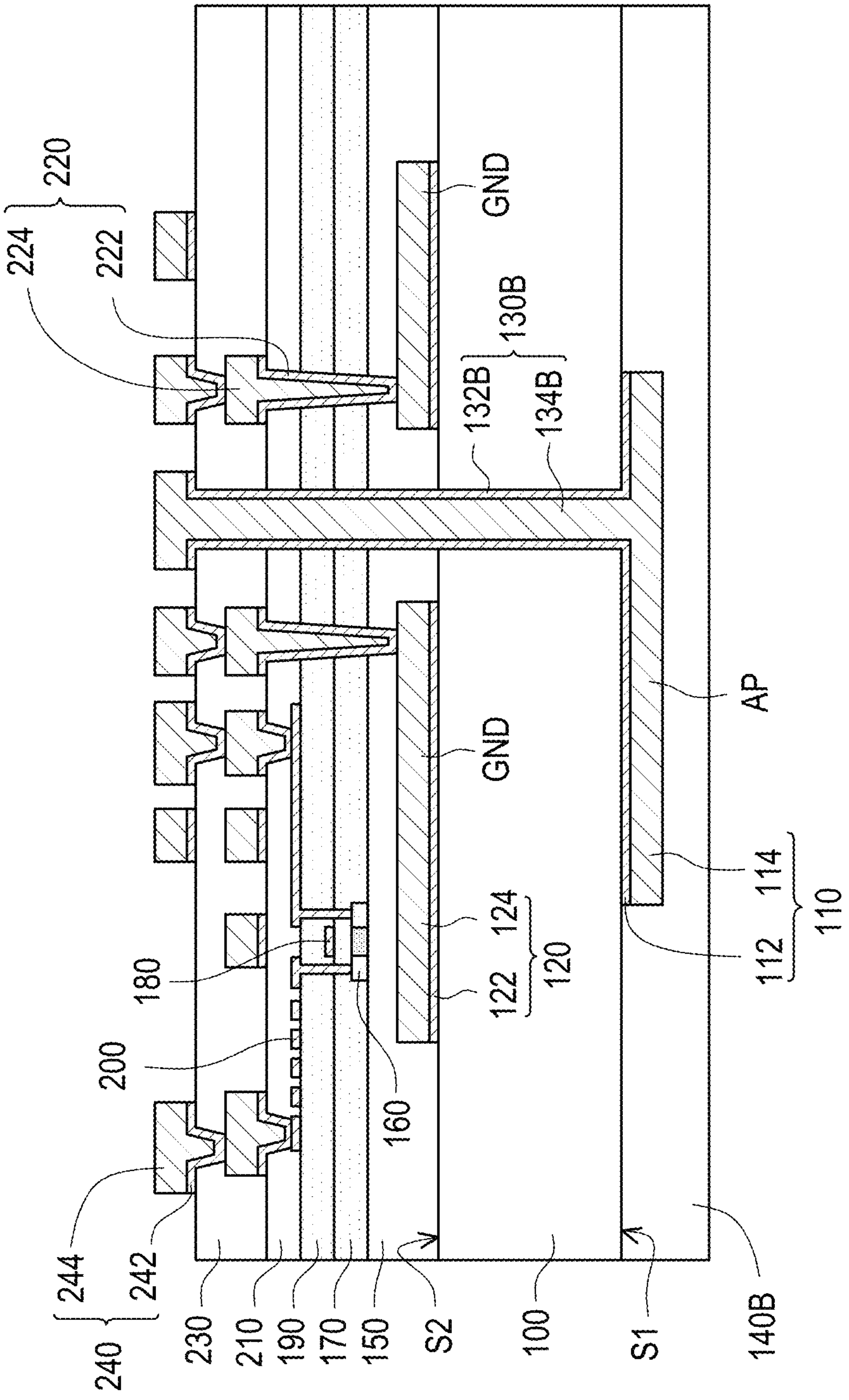

Referring to FIG. 5G, a protective layer 140B is formed on the antenna electrode layer 110.

Figure 5H:
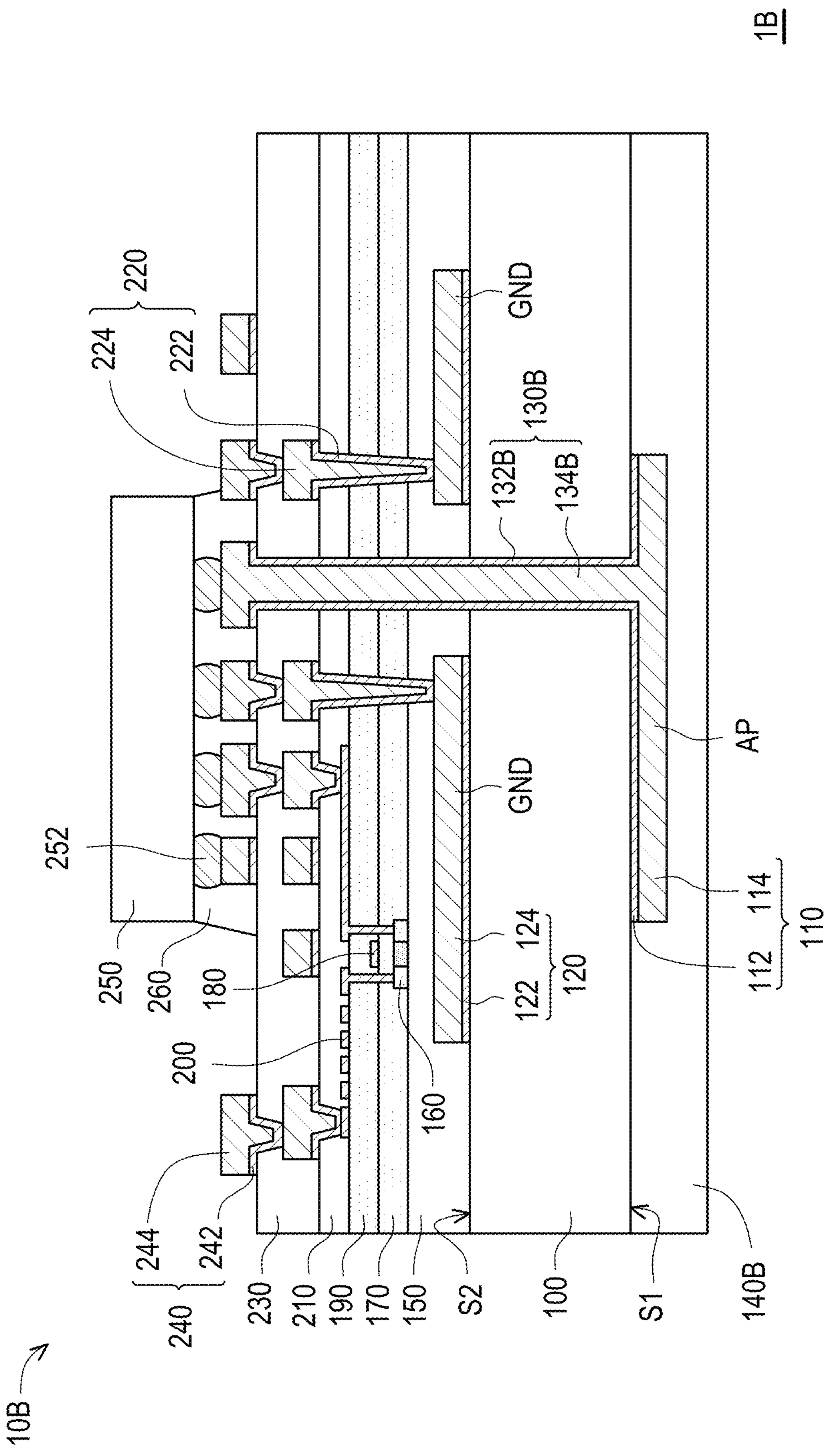

Referring to FIG. 5H, the chip 250 is bonded to the second redistribution layer 240, and an underfill material 260 is formed between the chip 250 and the second redistribution layer 240.

Figure 6A:
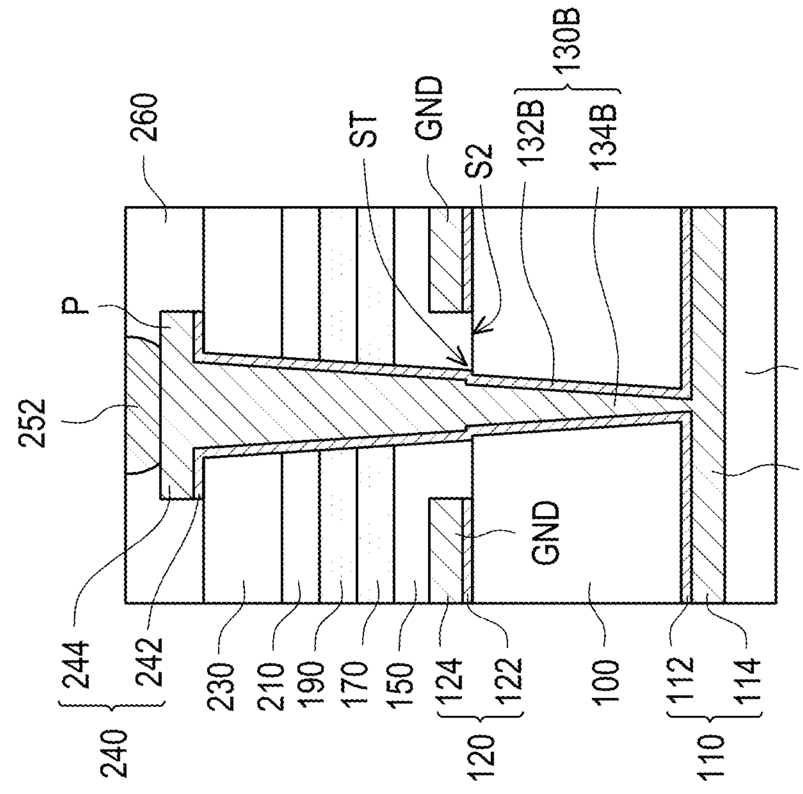
FIG. 6A is a schematic partial cross-sectional view of an antenna device according to an embodiment of the present invention.

FIG. 6A is a schematic partial cross-sectional view of an antenna device according to an embodiment of the present invention. The antenna device of FIG. 6A is similar to the antenna device 1B of FIG. 4, with the difference being that in the embodiment of FIG. 6A, the width of the conductive through hole 130B on the side near the pad P is different from the width of the conductive through hole 130B on the side near the antenna electrode AP. In the embodiment of FIG. 6A, the width of the conductive through hole 130B on the side near the pad P is greater than the width of the conductive through hole 130B on the side near the antenna electrode AP. In some embodiments, the conductive through hole 130B has a step ST near the interface between the transparent substrate 100 and the buffer layer 150, so that part of the conductive through hole 130B contacts the second surface S2 of the transparent substrate 100. For example, during the drilling process (refer to FIG. 5D), due to the different laser absorption rates of various materials, a step is formed at the interface when the buffer layer 150 (e.g., polyimide) and the transparent substrate 100 (e.g., glass) are penetrated in one drilling process. This allows the width of the conductive via 130B at the buffer layer 150 to be greater than the width of the conductive via 130B at the transparent substrate 100. An additional advantage of this step is that it can reduce issues arising from thermal stress in subsequent processes.

Figure 6B:
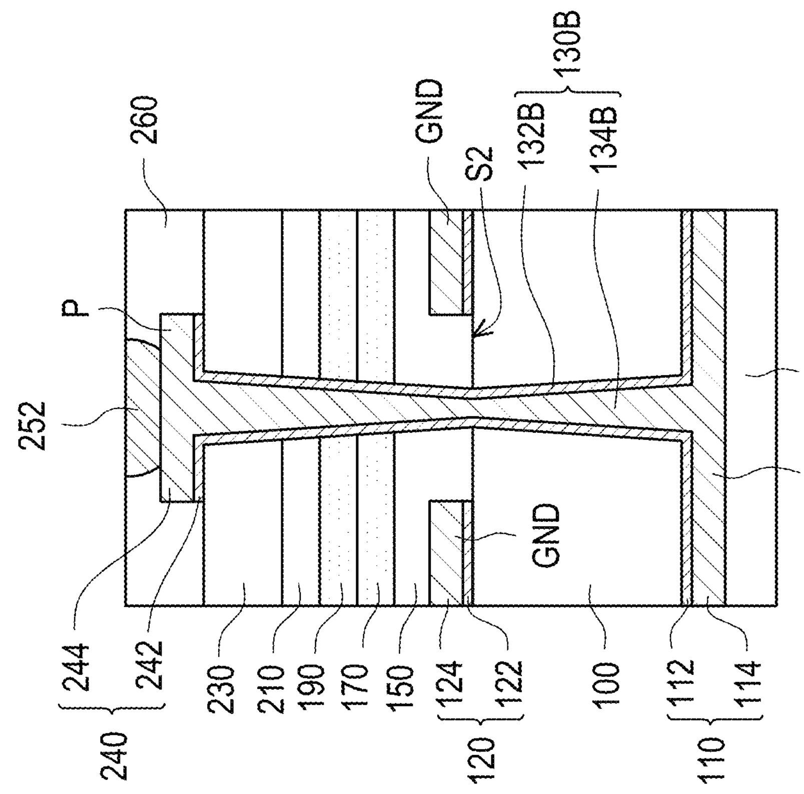
FIG. 6B is a schematic partial cross-sectional view of an antenna device according to an embodiment of the present invention.

FIG. 6B is a schematic partial cross-sectional view of an antenna device according to an embodiment of the present invention. The antenna device in FIG. 6B is similar to the antenna device 1B in FIG. 4, with the difference being that in the embodiment of FIG. 6B, the conductive through hole 130B has a structure that is wide on the upper and lower sides and narrow in the middle. For example, the conductive through hole 130B has a minimum width near the interface between the transparent substrate 100 and the buffer layer 150.

Figure 6D:
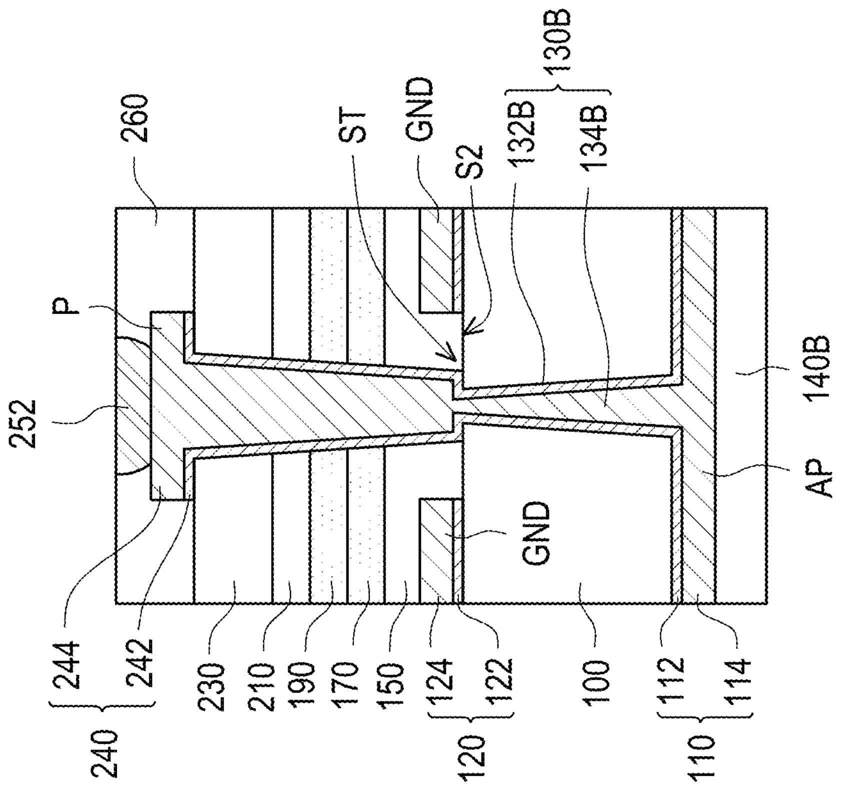
FIG. 6D is a schematic partial cross-sectional view of an antenna device according to an embodiment of the present invention.
Figure 6C:
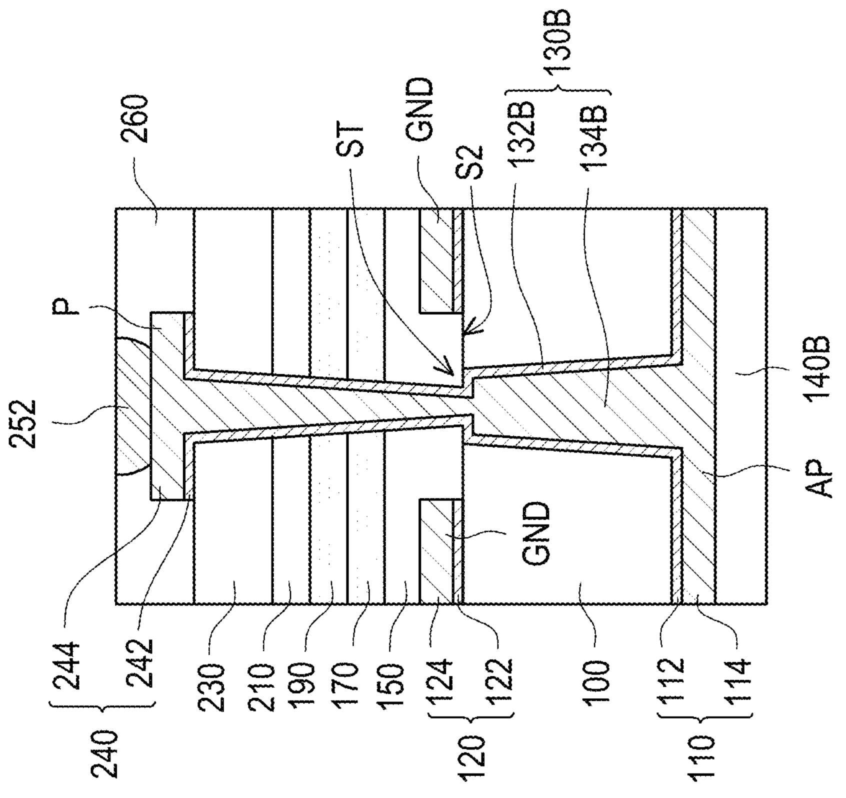
FIG. 6C is a schematic partial cross-sectional view of an antenna device according to an embodiment of the present invention.

In some embodiments, during the drilling process (refer to FIG. 5D), laser drilling is first performed from the first side S1 of the transparent substrate 100, stopping approximately at the interface between the transparent substrate 100 and the buffer layer 150. Next, laser drilling is conducted from the second organic insulating layer 230, creating a hole that connects with the previously formed hole from the first side S1, resulting in a through hole that is wide on the upper and lower sides and narrow in the middle. Finally, conductive material is filled into the through hole to obtain the conductive through hole 130B that is wide on the upper and lower sides and narrow in the middle. In the embodiment shown in FIG. 6B, the conductive through hole 130B does not have a step at the interface between the transparent substrate 100 and the buffer layer 150, but the present invention is not limited thereto. In other embodiments, the conductive through hole 130B may have a step ST at the interface between the transparent substrate 100 and the buffer layer 150, as illustrated in FIG. 6C and FIG. 6D.

Figure 7:
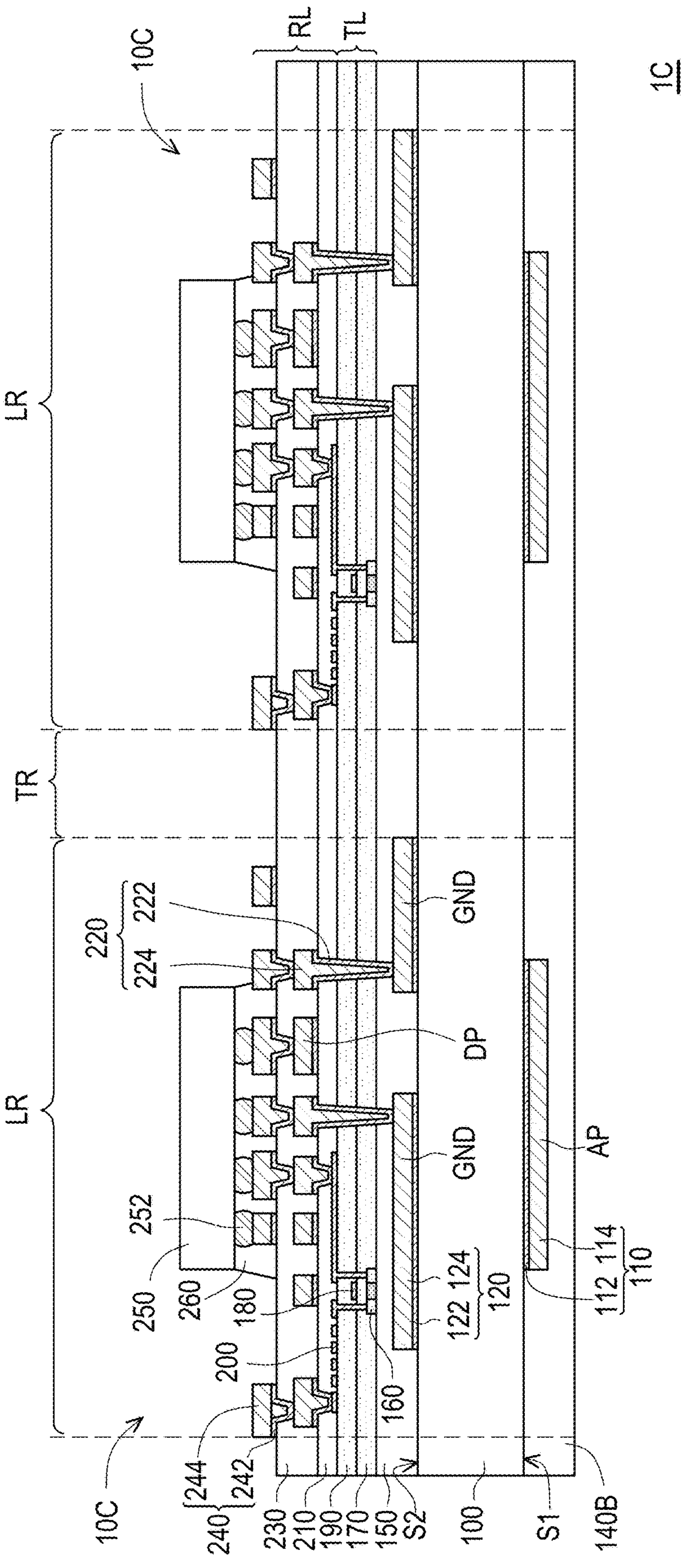
FIG. 7 is a schematic cross-sectional view of an antenna device according to an embodiment of the present invention.

FIG. 7 is a schematic cross-sectional view of an antenna device 1C according to an embodiment of the present invention. It should be noted that the embodiment in FIG. 7 follows the component designations and some content from the embodiment in FIG. 1, where the same or similar designations are used to indicate the same or similar components, and descriptions of the same technical content are omitted. For explanations of the omitted parts, please refer to the aforementioned embodiments, which will not be repeated here.

The difference between antenna device 1C in FIG. 7 and the antenna device 1A in FIG. 1 is that in the antenna device 1C, the antenna electrode AP is driven by signal coupling.

In this embodiment, the ground electrode GND has an opening that overlaps the antenna electrode AP. The first redistribution layer 220 of the redistribution structure RL includes a driving electrode DP, where the driving electrode DP overlaps the opening of the ground electrode GND and the antenna electrode AP.

The antenna device 1C includes a plurality of the antenna units 10C arranged in an array. The manufacturing method of the antenna units 10C in the antenna device 1C will be described below with reference to FIGS. 8A to 8C.

Figure 8A:
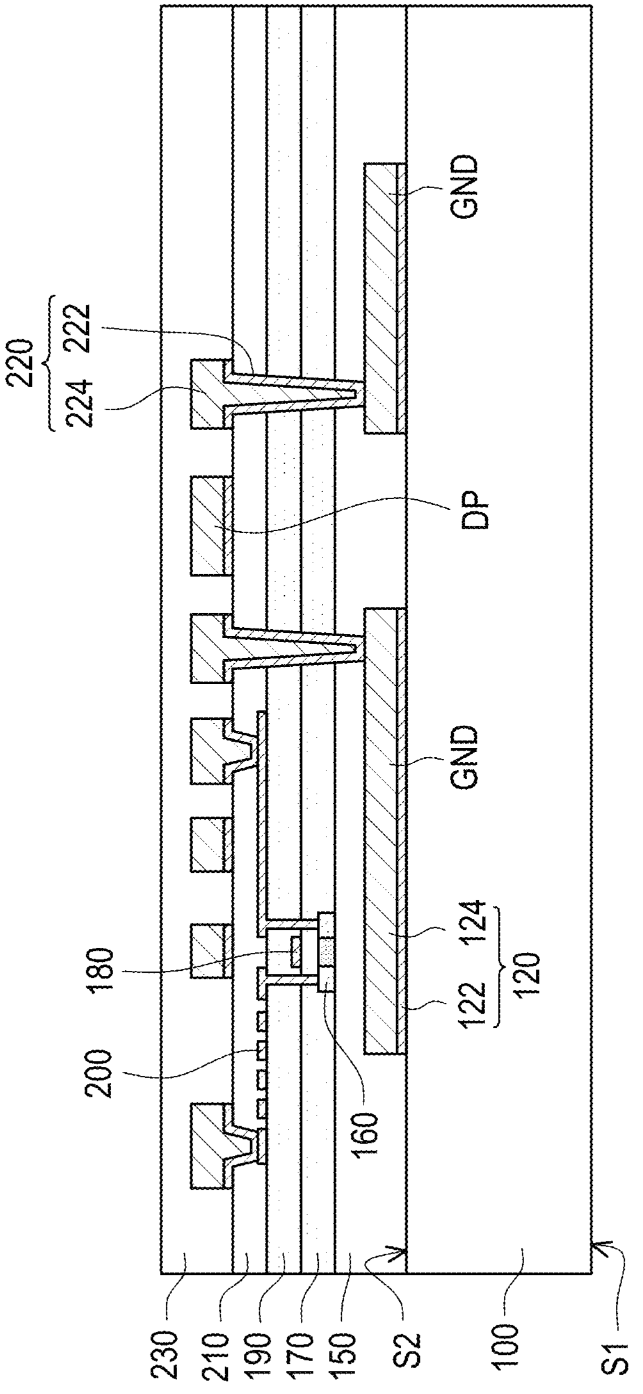
FIGS. 8A to 8C are schematic cross-sectional views of various stages of the manufacturing process of an antenna unit according to an embodiment of the present invention.

Referring to FIG. 8A, a conductive layer 120, a buffer layer 150, a semiconductor layer 160, a first dielectric layer 170, a first wire layer 180, a second dielectric layer 190, a second wire layer 200, a first organic insulating layer 210, and a first redistribution layer 220 and a second organic insulating layer 230 are formed. The method for forming the aforementioned layers is similar to the embodiment shown in FIGS. 5A to 5C, with the difference being that, in this embodiment, the first redistribution layer 220 includes the driving electrode DP.

Figure 8B:
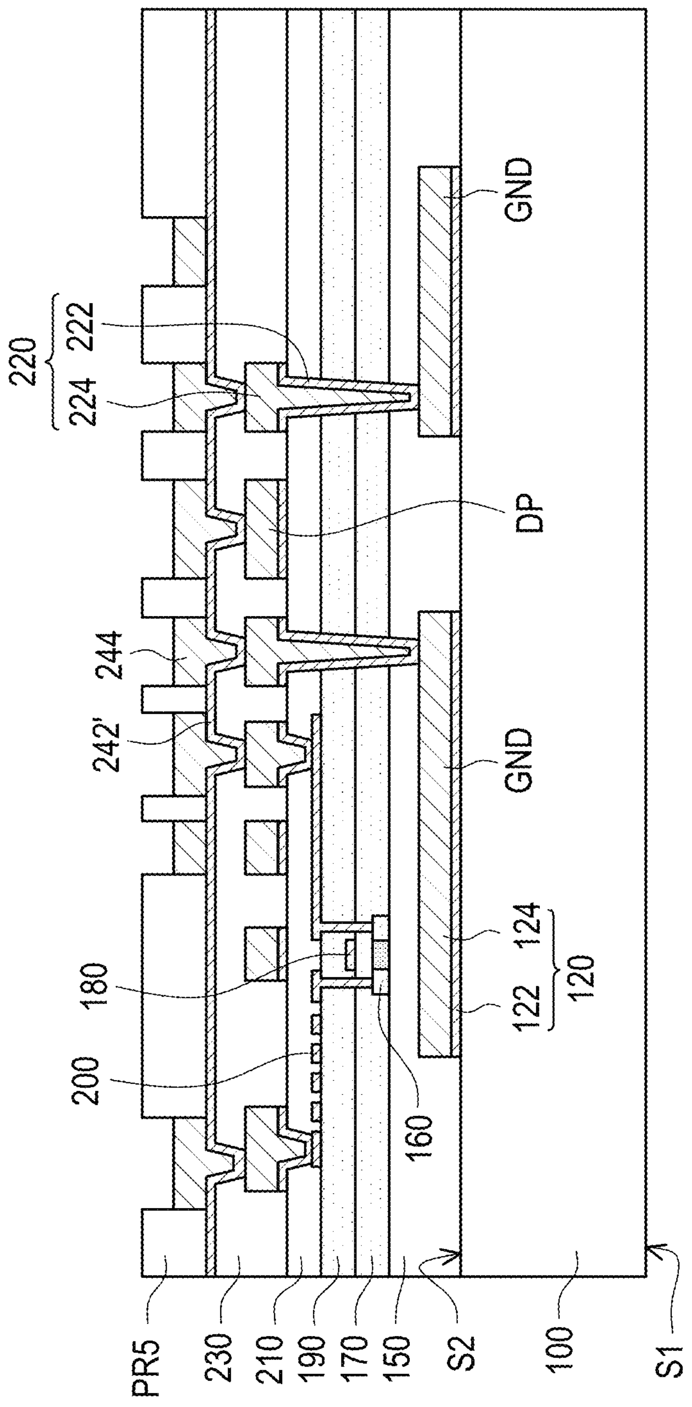

Referring to FIG. 8B, multiple openings are formed in the second organic insulating layer 230 through laser drilling or other suitable processes. Then, a second redistribution layer is formed on the surface of the second organic insulating layer 230 and the aforementioned openings.

For example, a blanket seed material layer 242' is first formed on the surface of the second organic insulating layer 230 and in the openings of the second organic insulating layer 230. Next, a photoresist pattern layer PR5 is formed on the seed material layer 242'. A metal layer 244 is formed on the portion of the seed material layer 242' exposed by the photoresist pattern layer PR5 using an electroplating process.

Figure 8C:
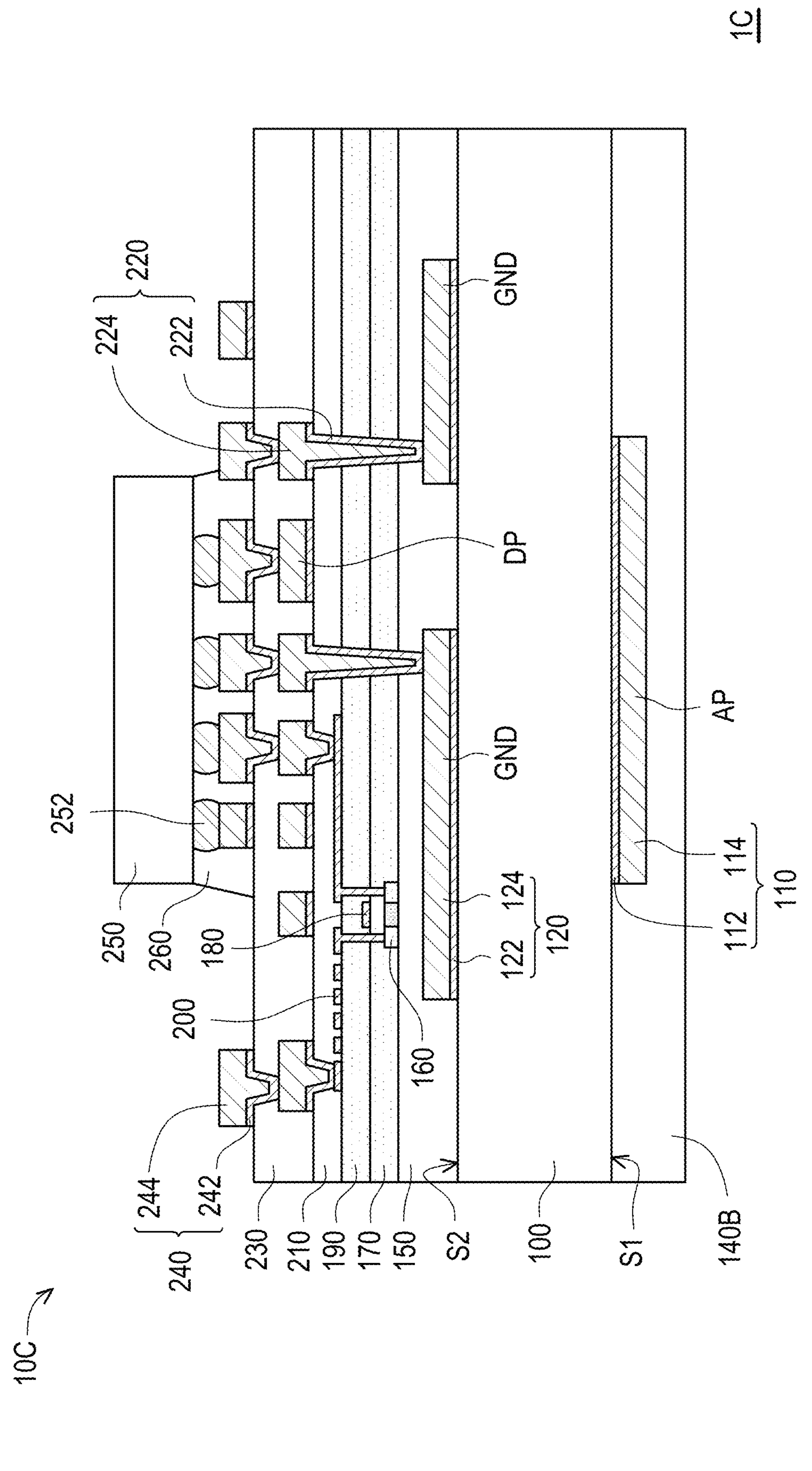

Referring to FIG. 8C, the photoresist pattern layer PR5 and the seed material layer 242' located below it are removed. The remaining seed material layer is referred to as the seed layer 242.

Finally, the chip 250 is bonded to the second redistribution layer 240, and the underfill material 260 is formed between the chip 250 and the second redistribution layer 240.

Figure 9:
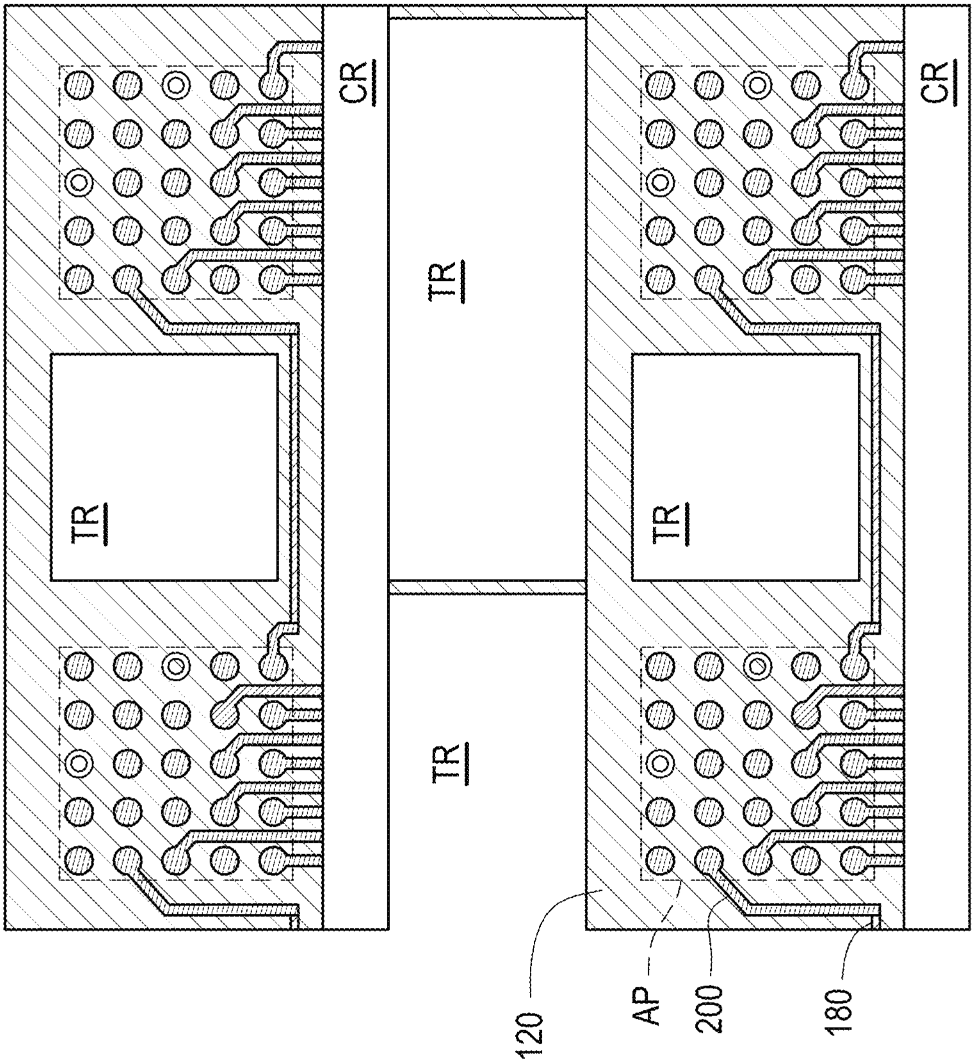
FIG. 9 is a schematic top view of an antenna device according to an embodiment of the present invention.

FIG. 9 is a schematic top view of an antenna device according to an embodiment of the present invention. FIG. 9 shows the conductive layer 120, the first and second wire layers 180, 200 in the active device layer, and the antenna electrode AP of the antenna device, and other components are omitted. For descriptions of the other components, reference may be made to any of the foregoing embodiments and will not be described again here.

Referring to FIG. 9, in this embodiment, the antenna device includes a light transmitting region TR in which no metal structure is provided. In this embodiment, the active device layer TL includes a circuit CR, wherein the circuit CR includes multiple active devices (not shown). In this embodiment, the active devices do not overlap the antenna electrode AP.

Figure 10:
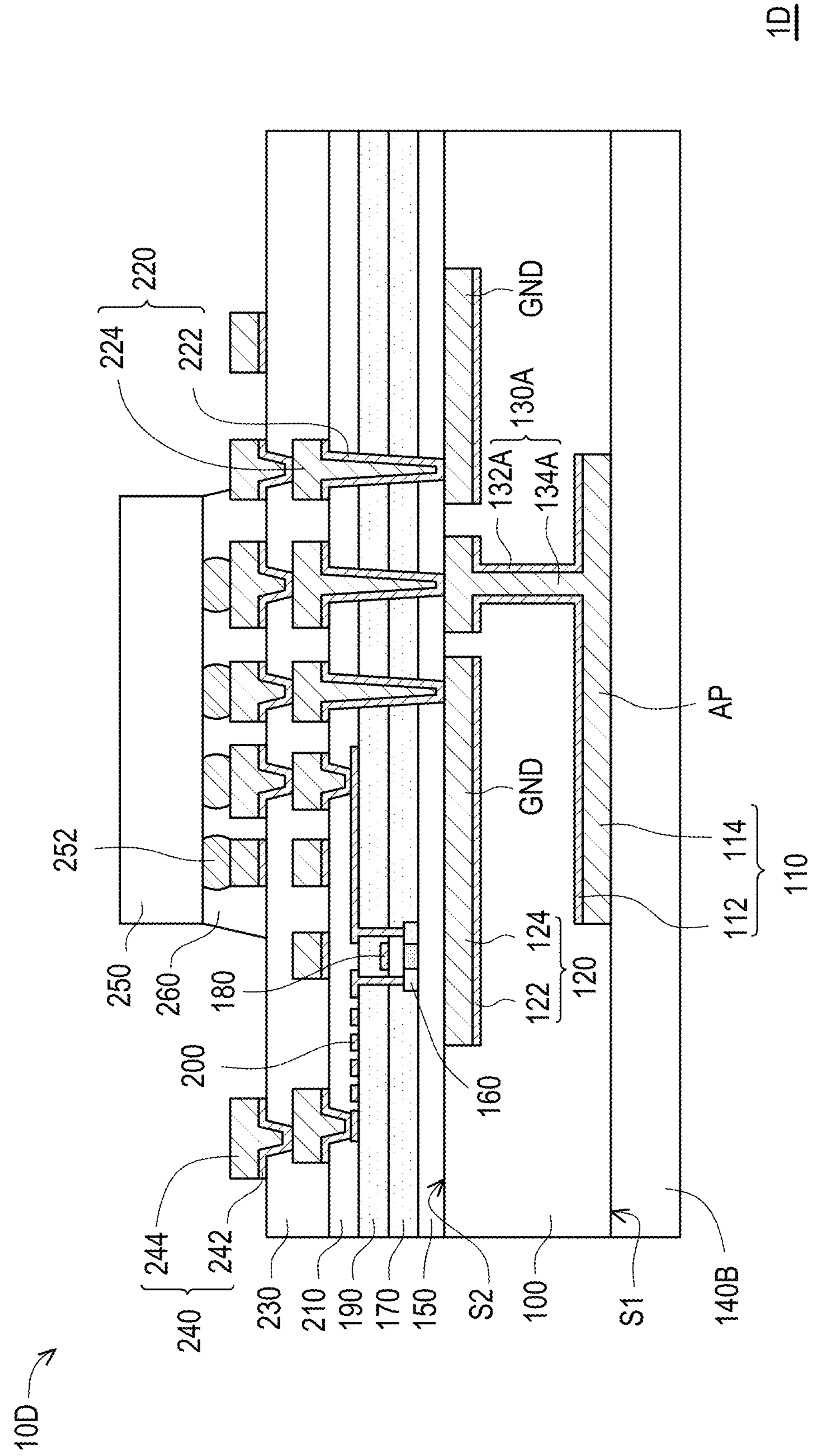
FIG. 10 is a schematic cross-sectional view of an antenna device according to an embodiment of the present invention.

FIG. 10 is a schematic cross-sectional view of an antenna unit 10D of an antenna device 1D according to an embodiment of the present invention. It should be noted that the embodiment in FIG. 10 follows the component designations and some content from the embodiment in FIG. 1, where the same or similar designations are used to indicate the same or similar components, and descriptions of the same technical content are omitted. For explanations of the omitted parts, please refer to the aforementioned embodiments, which will not be repeated here.

The difference between the antenna device 1D in FIG. 10 and the antenna device 1A in FIG. 1 is that in the antenna device 1D, the antenna electrode AP and/or the conductive layer 120 are embedded in the transparent substrate 100. For example, a groove is first formed on the transparent substrate 100 to accommodate the antenna electrode AP and/or the conductive layer 120. The antenna electrode AP and/or the conductive layer 120 are then formed within the groove. This design allows the antenna device 1D to have a relatively flat surface.

Figure 11:
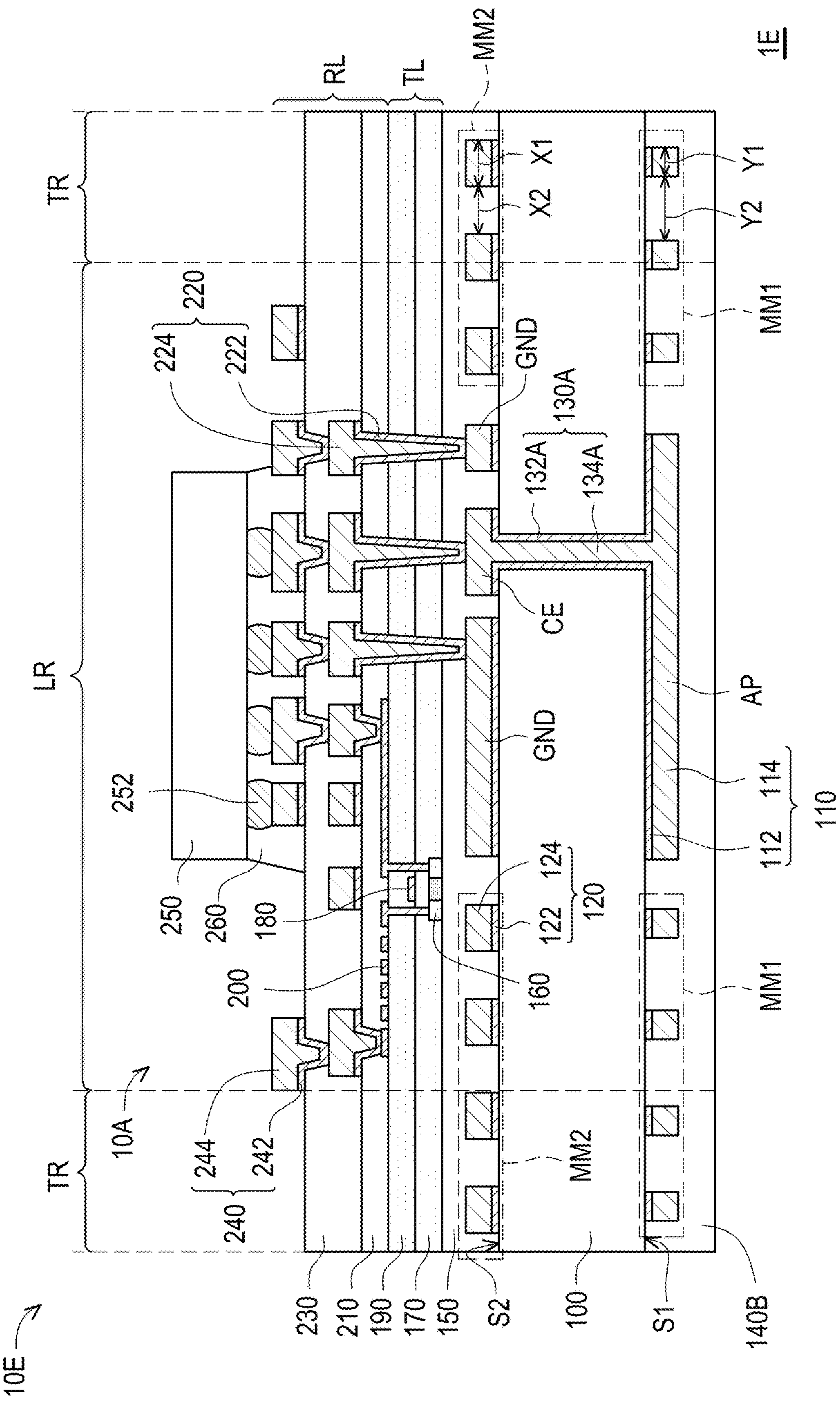
FIG. 11 is a schematic cross-sectional view of an antenna unit according to an embodiment of the present invention.

FIG. 11 is a schematic cross-sectional view of an antenna unit 10E of an antenna device 1E according to an embodiment of the present invention. It should be noted that the embodiment in FIG. 11 follows the component designations and some content from the embodiment in FIGS. 2A to 2L, where the same or similar designations are used to indicate the same or similar components, and descriptions of the same technical content are omitted. For explanations of the omitted parts, please refer to the aforementioned embodiments, which will not be repeated here.

In this embodiment, the antenna electrode layer 110 of the antenna device 1E includes the antenna electrode AP and the first metal mesh MM1. The first metal mesh MM1 is connected to the antenna electrode AP. In this embodiment, the electrode antenna AP is disposed in the circuit layout region LR, and the first metal mesh MM1 extends from the circuit layout region LR to the light transmitting region TR, so that a first part of the first metal mesh MM1 is located in the circuit layout region LR, and a second part of the first metal mesh MM1 is located in the light transmitting region TR. In some embodiments, the first metal mesh MM1 is only disposed in the light transmitting region TR but not in the circuit layout region LR. In some embodiments, when the metal mesh is included in the light transmitting region TR, the transmittance of the light transmitting region TR ranges from 35% to 83%.

In some embodiments, the area of the antenna electrode AP is approximately the same as the area of the chip 250. For example, the area of the antenna electrode AP may range from 0.8 to 1.2 times the area of the chip 250 to prevent issues related to misalignment during the manufacturing process.

In some embodiments, the line width Y1 to the line pitch Y2 of the first metal mesh MM1 is in a ratio of 1:1 to 1:50. For example, the ratio may be 1:1, 1:10, 1:20, 1:30, 1:40, or 1:50.

The conductive layer 120 includes the ground electrode GND, the connection electrode CE, and the second metal mesh MM2. The second metal mesh MM2 is connected to the ground electrode GND. In this embodiment, the ground electrode GND is located within the circuit layout region LR, and the second metal mesh MM2 extends from the circuit layout region LR to the transparent region TR. A first portion of the second metal mesh MM2 is located within the circuit layout region LR, while a second portion of the second metal mesh MM2 is located within the transparent region TR. In some embodiments, the second metal mesh MM2 is only disposed in the transparent region TR and not in the circuit layout region LR.

The area of the ground electrode GND is approximately the same as the area of the chip 250. For example, the area of the ground electrode GND may range from 0.8 to 1.2 times the area of the chip 250 to prevent issues related to misalignment during the manufacturing process.

In some embodiments, the line width X1 to the line pitch X2 of the second metal mesh MM2 is in a ratio of 1:1 to 1:50. For example, the ratio may be 1:1, 1:10, 1:20, 1:30, 1:40 or 1:50. In some embodiments, the metal lines in the first metal mesh MM1 are parallel to and overlap the metal lines in the second metal mesh MM2, but the invention is not limited thereto. In other embodiments, the extension direction of the metal lines in the first metal mesh MM1 is staggered with the extension direction of the metal lines in the second metal mesh MM2.

In this embodiment, by placing the first metal mesh MM1 and the second metal mesh MM2 within the transparent region TR, the transmittance of the antenna device 1E becomes more uniform, preventing users from easily noticing the presence of the circuit layout region LR. Additionally, this design increases the aperture ratio of the antenna device 1E and reduces its warping issues.

In some embodiments, the line width and line distance of the metal lines in the first metal mesh MM1 and the second metal mesh MM2 will affect the transmittance of the light transmitting region TR. The transmittance of the light transmitting region TR without any metallic components and the transmittance of the light transmitting region TR containing one of the first metal mesh MM1 and the second metal mesh MM2 are as shown in Table 1.

TABLE 1

| | The transmittance of the light transmitting region TR | |
|---|---|---|
| Without any metallic components | 70% | 85% |
| The line width:the line pitch of the metal lines = 1:1 | 35% | 43% |
| The line width:the line pitch of the metal lines = 1:5 | 56% | 68% |
| The line width:the line pitch of the metal lines = 1:50 | 69% | 83% |

Figure 12:
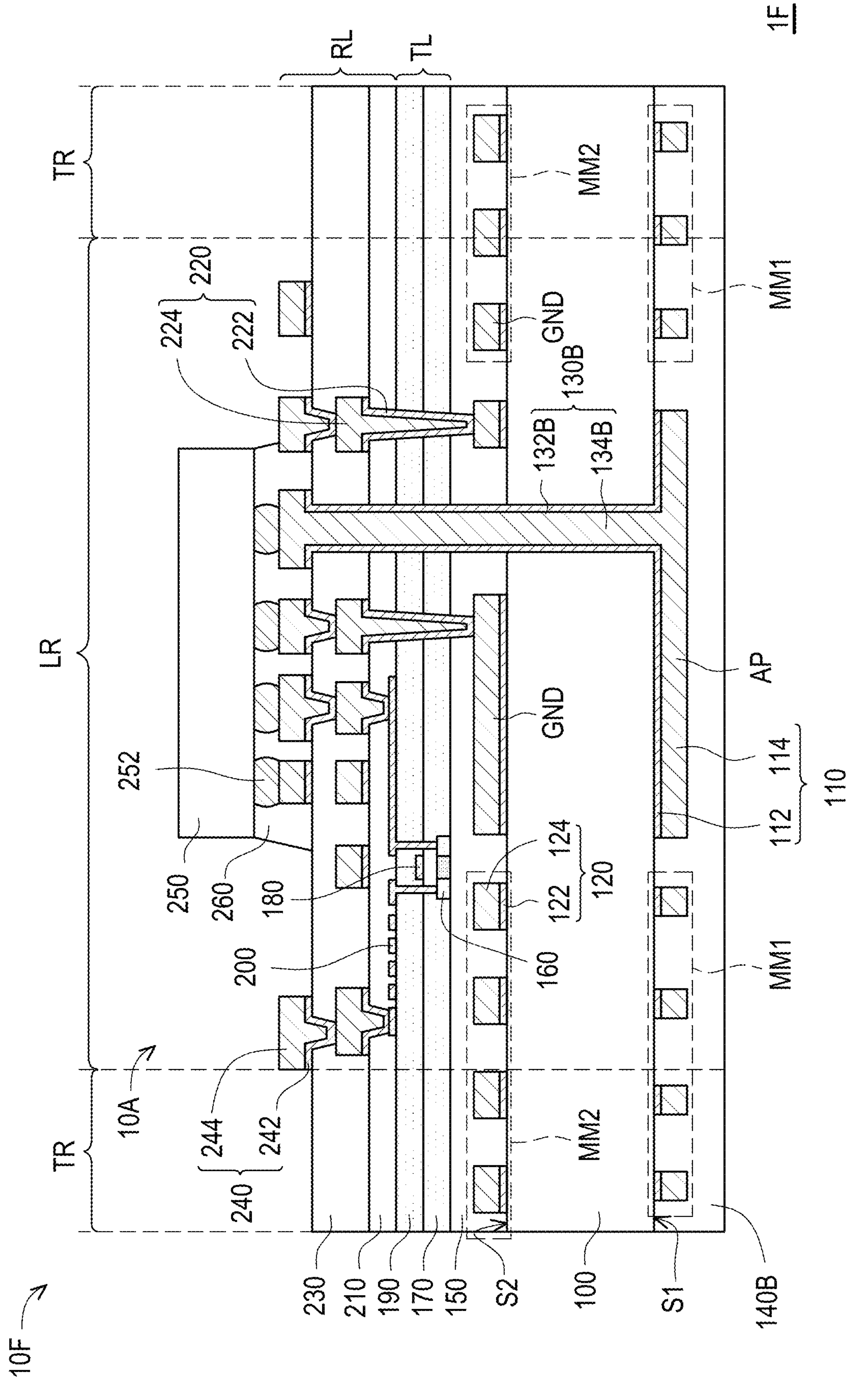
FIG. 12 is a schematic cross-sectional view of an antenna unit according to an embodiment of the present invention.

FIG. 12 is a schematic cross-sectional view of an antenna unit 10F of an antenna device 1F according to an embodiment of the present invention. It should be noted that the embodiment in FIG. 12 follows the component designations and some content from the embodiment in FIGS. 5A to 5H and the embodiment in FIG. 11, where the same or similar designations are used to indicate the same or similar components, and descriptions of the same technical content are omitted. For explanations of the omitted parts, please refer to the aforementioned embodiments, which will not be repeated here.

Referring to FIG. 12, the antenna electrode layer 110 of the antenna device 1F includes the antenna electrode AP and the first metal mesh MM1. The first metal mesh MM1 is connected to antenna electrode AP. In this embodiment, the electrode antenna AP is disposed in the circuit layout region LR, and the first metal mesh MM1 extends from the circuit layout region LR to the light transmitting region TR, so that a first part of the first metal mesh MM1 is located in the circuit layout region LR, and a second part of the first metal mesh MM1 is located in the light transmitting region TR. In some embodiments, the first metal mesh MM1 is only disposed in the light transmitting region TR but not in the circuit layout region LR.

The conductive layer 120 includes the ground electrode GND and the second metal mesh MM2. The second metal mesh MM2 is connected to the ground electrode GND. In this embodiment, the ground electrode GND is disposed in the circuit layout region LR, and the second metal mesh MM2 extends from the circuit layout region LR to the light transmitting region TR, so that a first part of the second metal mesh MM2 is located in the circuit layout region LR, and a second part of the second metal mesh MM2 is located in the light transmitting region TR. In some embodiments, the second metal mesh MM2 is only disposed in the light transmitting region TR but not in the circuit layout region LR.

In this embodiment, by placing the first metal mesh MM1 and the second metal mesh MM2 within the transparent region TR, the transmittance of the antenna device 1F becomes more uniform, preventing users from easily noticing the presence of the circuit layout region LR. Additionally, this design increases the aperture ratio of the antenna device 1F and reduces its warping issues.

Figure 13:
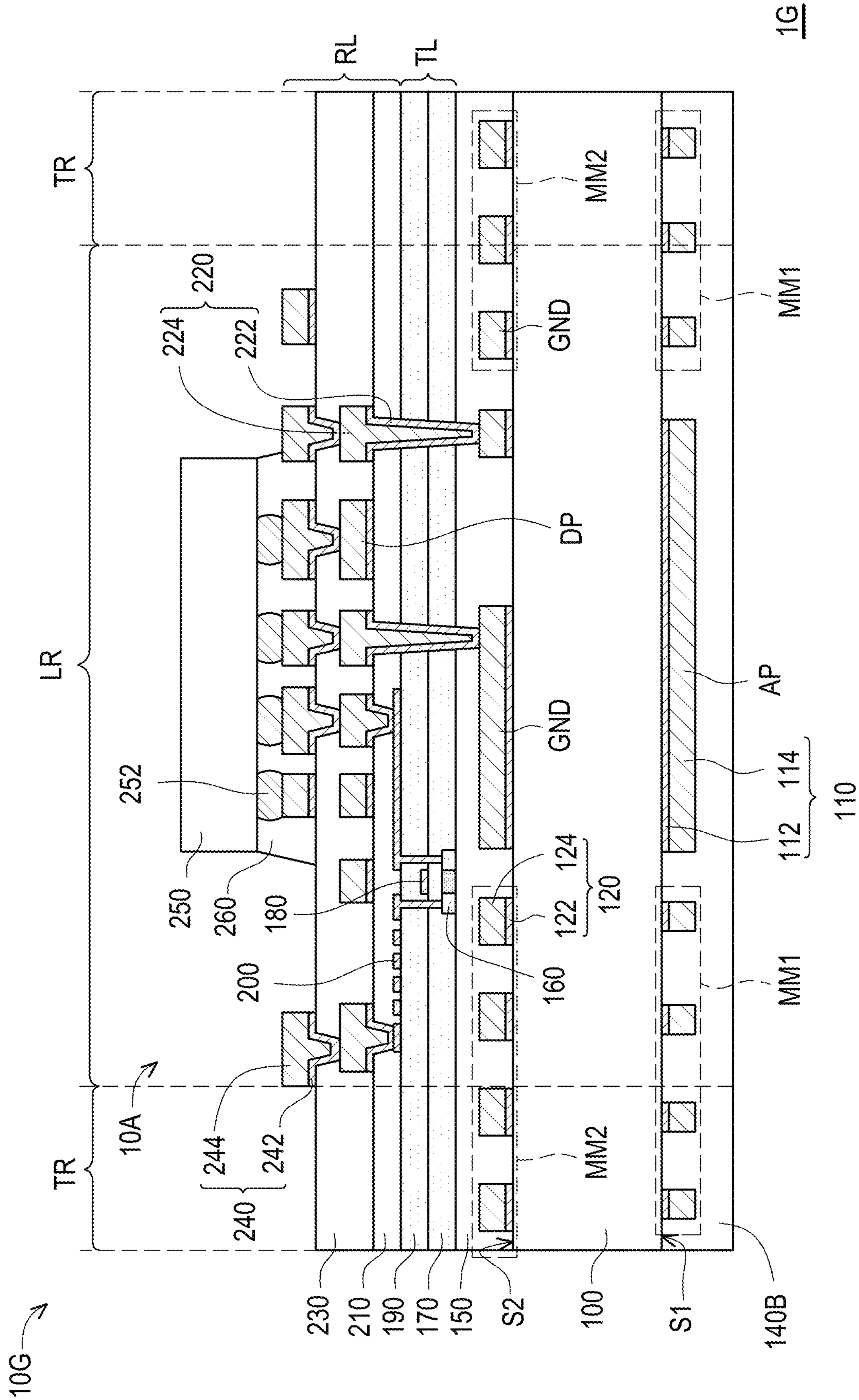
FIG. 13 is a schematic cross-sectional view of an antenna unit according to an embodiment of the present invention.

FIG. 13 is a schematic cross-sectional view of an antenna unit 10G of an antenna device 1G according to an embodiment of the present invention. It should be noted that the embodiment in FIG. 13 follows the component designations and some content from the embodiment in FIGS. 8A to 8C and the embodiment in FIG. 11, where the same or similar designations are used to indicate the same or similar components, and descriptions of the same technical content are omitted. For explanations of the omitted parts, please refer to the aforementioned embodiments, which will not be repeated here.

Referring to FIG. 13, the antenna electrode layer 110 of the antenna device 1G includes an antenna electrode AP and a first metal mesh MM1. The first metal mesh MM1 is connected to the antenna electrode AP. In this embodiment, the electrode antenna AP is disposed in the circuit layout region LR, and the first metal mesh MM1 extends from the circuit layout region LR to the light transmitting region TR, so that a first part of the first metal mesh MM1 is located in the circuit layout region LR, and a second part of the first metal mesh MM1 is located in the light transmitting region TR. In some embodiments, the first metal mesh MM1 is only disposed in the light transmitting region TR but not in the circuit layout region LR.

The conductive layer 120 includes the ground electrode GND and the second metal mesh MM2. The second metal mesh MM2 is connected to the ground electrode GND. In this embodiment, the ground electrode GND is disposed in the circuit layout region LR, and the second metal mesh MM2 extends from the circuit layout region LR to the light transmitting region TR, so that a first part of the second metal mesh MM2 is located in the circuit layout region LR, and a second part of the second metal mesh MM2 is located in the light transmitting region TR. In some embodiments, the second metal mesh MM2 is only disposed in the light transmitting region TR but not in the circuit layout region LR.

In this embodiment, by placing the first metal mesh MM1 and the second metal mesh MM2 within the transparent region TR, the transmittance of the antenna device 1G becomes more uniform, preventing users from easily noticing the presence of the circuit layout region LR. Additionally, this design increases the aperture ratio of the antenna device 1G and reduces its warping issues.

Figure 14:
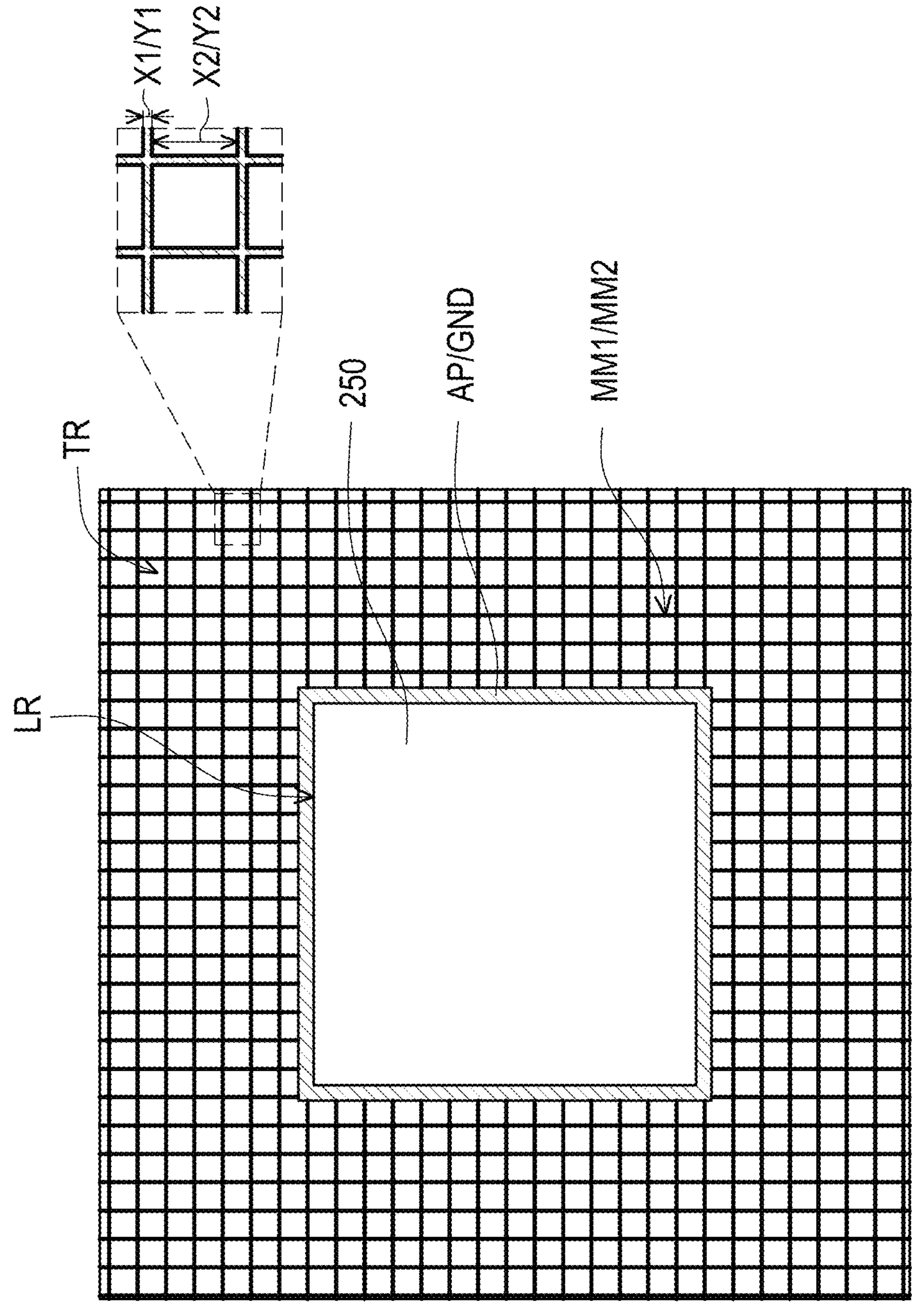
FIG. 14 is a schematic top view of an antenna unit according to an embodiment of the present invention.

FIG. 14 is a schematic top view of an antenna unit according to an embodiment of the present invention. FIG. 14 shows the antenna electrode layer (including the antenna electrode AP and the first metal mesh MM1), the conductive layer (including the ground electrode GND and the second metal mesh MM2) and the chip 250 of the antenna device, and other components are omitted. For descriptions of other components, reference may be made to any of the foregoing embodiments and will not be described again here.

Referring to FIG. 14, In this embodiment, the antenna electrode AP of the antenna electrode layer 110 and the ground electrode GND of the conductive layer 120 are arranged in the circuit layout region LR and overlap with the chip 250. The first metal mesh MM1 of the antenna electrode layer 110 and the second metal mesh MM2 of the conductive layer 120 overlap each other and are disposed in the light transmitting region TR. By setting the first metal mesh MM1 and the second metal mesh MM2, the difference in transmittance between the circuit layout region LR and the light transmitting region TR can be reduced, preventing users from easily noticing the presence of the circuit layout region LR.

What is claimed is:

1. A transparent antenna device, comprising:
- a transparent substrate having a first surface and a second surface opposite to the first surface;
- an antenna electrode layer, located on the first surface of the transparent substrate and comprising:
  - an antenna electrode, located in a circuit layout region of the transparent antenna device;
- an active device layer, located on the second surface of the transparent substrate and comprising:
  - an active device, located in the circuit layout region;
- a redistribution structure, located on the active device layer and comprising:
  - a signal line and a pad, located in the circuit layout region; and
- a chip, bonded to the pad of the redistribution structure and located in the circuit layout region, wherein the transparent antenna device has a light transmitting region located next to the circuit layout region, and a transmittance of the light transmitting region is from 35% to 85%.

2. The transparent antenna device of claim 1, further comprises:
- a conductive layer, located between the second surface of the transparent substrate and the active device layer, and comprising:
  - a ground electrode, at least partially overlapping with the antenna electrode and electrically connected to the chip; and
  - a connection electrode, electrically connected to the chip, wherein the ground electrode surrounds the connection electrode; and
- a conductive through hole, extending from the first surface to the second surface of the transparent substrate, and connected to the antenna electrode and the connection electrode.

3. The transparent antenna device of claim 2, wherein a width of the conductive through hole on a side near the antenna electrode is different from a width of the conductive through hole on a side near the connection electrode.

4. The transparent antenna device of claim 1, further comprises:
- a conductive through hole, extending from the pad of the redistribution structure to the first surface of the transparent substrate, wherein the conductive through hole passes through the active device layer and the transparent substrate, and is electrically connected to the antenna electrode and the pad.

5. The transparent antenna device of claim 1, further comprises:
- a conductive layer, located between the second surface of the transparent substrate and the active device layer, and comprising:
  - a ground electrode, at least partially overlapping with the antenna electrode, and electrically connected to the chip, wherein the ground electrode comprises an opening overlapping with the antenna electrode; wherein the redistribution structure further comprises a driving electrode, which overlaps the opening and antenna electrode.

6. The transparent antenna device of claim 1, further comprises:
- an underfill material, located between the chip and the redistribution structure, and surrounding a joint between the chip and the redistribution structure.

7. The transparent antenna device of claim 1, wherein the antenna electrode layer further comprises:

a first metal mesh, electrically connected to the antenna electrode, wherein a line width to a line pitch of the first metal mesh is in a ratio of 1:1 to 1:50, wherein a first part of the first metal mesh is located in the circuit layout region, and a second part of the first metal mesh is located in the light transmitting region.

8. The transparent antenna device of claim 1, further comprises:

a conductive layer, located between the second surface of the transparent substrate and the active device layer, and comprising:

a ground electrode, at least partially overlapping with the antenna electrode and electrically connected to the chip; and a second metal mesh, connected to the ground electrode, wherein a line width to a line pitch of the second metal mesh is in a ratio of 1:1 to 1:50, wherein the second metal mesh is at least partially located in the light transmitting region.

9. The transparent antenna device of claim 1, further comprises:

a conductive layer, located between the second surface of the transparent substrate and the active device layer, and comprising:

a ground electrode, at least partially overlapping with the antenna electrode and electrically connected to the chip, wherein a width of the ground electrode is greater than a width of the antenna electrode.

10. The transparent antenna device of claim 1, wherein the active device layer comprises:

a semiconductor channel structure;

a first dielectric layer, located on the semiconductor channel structure;

a gate electrode, overlapping with the semiconductor channel structure;

a plurality of source/drain electrodes, electrically connected to the semiconductor channel structure, wherein the active device comprises the semiconductor channel structure, the gate electrode and the source/drain electrodes; wherein the redistribution structure comprises:

a first organic insulating layer, located above the active device layer;

a first redistribution layer, located on the first organic insulating layer;

a second organic insulating layer, located on the first organic insulating layer, wherein a thickness of the second organic insulating layer is greater than a thickness of the first dielectric layer; and a second redistribution layer, located on the second organic insulating layer and comprising the pad and the signal line.

* * * * *